US009832169B2

United States Patent
Border et al.

(10) Patent No.: US 9,832,169 B2
(45) Date of Patent: Nov. 28, 2017

(54) METHOD AND SYSTEM FOR COMMUNICATING OVER A SEGMENTED VIRTUAL PRIVATE NETWORK (VPN)

(71) Applicant: Hughes Network Systems, LLC, Germantown, MD (US)

(72) Inventors: John Border, Adamstown, MD (US); Douglas Dillon, Gaithersburg, MD (US); Peter Pardee, Ramona, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/606,000

(22) Filed: Jan. 26, 2015

(65) Prior Publication Data

US 2015/0143505 A1     May 21, 2015

Related U.S. Application Data

(63) Continuation of application No. 10/352,992, filed on Jan. 28, 2003, now Pat. No. 8,976,798.
(Continued)

(51) Int. Cl.
*H04L 12/28*     (2006.01)
*H04L 29/06*     (2006.01)
*H04L 12/46*     (2006.01)

(52) U.S. Cl.
CPC ...... *H04L 63/0272* (2013.01); *H04L 12/4641* (2013.01); *H04L 63/029* (2013.01);
(Continued)

(58) Field of Classification Search
CPC .......... H04L 1/18–1/1896; H04L 1/16–1/1692
(Continued)

(56) References Cited

U.S. PATENT DOCUMENTS 5,825,891 A    10/1998  Levesque et al.
5,983,350 A    11/1999  Minear et al.
(Continued)

FOREIGN PATENT DOCUMENTS

WO    WO0165805 A2    9/2001

OTHER PUBLICATIONS

Border, et al., "Performance Enhancing Proxies Intended to Mitigate Link-Related Degradations", IETF, RFC 3135, Jun. 2001.
(Continued)

*Primary Examiner* — Andrew Chriss
*Assistant Examiner* — Kenan Cehic
(74) *Attorney, Agent, or Firm* — Potomac Technology Law, LLC

(57) ABSTRACT

An approach for providing secure communication services is disclosed. A secure data tunnel from a source node to a destination node is established via a plurality of secure segments across a data communications network. A data path is established via the secure data tunnel, where the data path supports a performance enhancing mechanism that improves performance of data communications over the data path. The performance enhancing mechanism multiplexes data packet flows from the source node for transmission over the data path, and performs one or more of connection startup latency reduction, acknowledgment message spoofing, window sizing adjustment, compression and selective retransmission.

20 Claims, 19 Drawing Sheets

Related U.S. Application Data

(60) Provisional application No. 60/352,462, filed on Jan. 28, 2002, provisional application No. 60/392,943, filed on Jul. 1, 2002.

(52) U.S. Cl.
CPC ...... H04L 63/0209 (2013.01); H04L 63/1466 (2013.01); H04L 63/0428 (2013.01)

(58) Field of Classification Search
USPC .................................... 370/401, 394, 395.2
See application file for complete search history.

(56) References Cited

U.S. PATENT DOCUMENTS

| | | | |
|---|---|---|---|
| 6,092,113 | A | 7/2000 | Maeshima et al. |
| 6,366,761 | B1 | 4/2002 | Montpetit |
| 6,571,289 | B1* | 5/2003 | Montenegro ......... H04L 63/029 709/227 |
| 6,693,878 | B1 | 2/2004 | Daruwalla et al. |
| 6,970,459 | B1* | 11/2005 | Meier ................. H04L 12/4641 370/389 |
| 6,975,647 | B2 | 12/2005 | Neale et al. |
| 2001/0030970 | A1 | 10/2001 | Wiryaman et al. |
| 2001/0047474 | A1 | 11/2001 | Takagi et al. |
| 2002/0026503 | A1* | 2/2002 | Bendinelli .......... H04L 12/2602 709/220 |
| 2002/0034173 | A1 | 3/2002 | Border et al. |
| 2002/0141393 | A1 | 10/2002 | Eriksson et al. |
| 2003/0031185 | A1* | 2/2003 | Kikuchi .............. H04L 43/0852 370/400 |
| 2003/0177395 | A1* | 9/2003 | Pardee .................... H04L 12/46 726/15 |
| 2008/0151917 | A1* | 6/2008 | Bartlett ............... H04L 12/4641 370/401 |
| 2009/0201828 | A1* | 8/2009 | Samuels ................. H04L 69/16 370/252 |

OTHER PUBLICATIONS

ESR, "European Search Report", EP App. No. 04250179.1, dated Apr. 1, 2005.

ESR, "European Search Report", EP App. No. 04250184.1, dated Jul. 26, 2006.

Gleeson, et al., "A Framework for IP Based Virtual Private Networks", IETF, RFC 2764, Feb. 2000.

Yurcik, et al., "Challenges to End-to-End Internet Model", Proceedings in the Americas Conference on Information Systems, IAMCIS 2000, Long Beach, CA, Aug. 2000.

* cited by examiner

METHOD AND SYSTEM FOR COMMUNICATING OVER A SEGMENTED VIRTUAL PRIVATE NETWORK (VPN)

RELATED APPLICATIONS

This application is a continuation, and claims the benefit of priority under 35 U.S.C. §120, from U.S. application Ser. No. 10/352,992 (filed 2003, Jan. 28), which claims the benefit of priority under 35 U.S.C. §119(e) from U.S. Provisional Application No. 60/352,462 (filed 2002, Jan. 28) and U.S. Provisional Application No. 60/392,943 (filed 2002, Jul. 01), the entireties of which are incorporated herein by reference.

FIELD

The present invention relates to secure communications over a communications system, and more particularly to enhancing network performance in a Virtual Private Network (VPN) environment.

BACKGROUND

Communications service providers face the continual task of designing high performance and secure networks. The emergence of Virtual Private Networks (VPNs) has provided network users with secure communications to their private network from remote sites. A private network is a network that allows multiple locations of a network to privately communicate; that is, to the exclusion of unauthorized users. In the past, private networks were implemented by using "leased line" communications circuits, as shown in FIG. 18. Private sites 1801, 1803, 1805, 1807 are interconnected by leased lines 1809, which are typically dedicated circuits supplied by a service provider. Within each of the sites 1801, 1803, 1805, 1807, multiple hosts are connected to the leased lines 1809 via a router. Security of the leased lines 1809 is ensured mainly by wire-tapping laws and the integrity of the service provider that supplies the leased lines.

By contrast, a virtual private network (VPN) permits an enterprise to communicate securely across a public network in such a way that the public network operates as one or more private communications links. FIG. 19 is a diagram of a conventional VPN, in which multiple private network sites 1901, 1903, 1905, 1907 are connected to a public network 1917, such as the Internet or a carrier's Internet Protocol (IP) internetwork. The packets originating from one private network site to another are encrypted and often cryptographically authenticated to provide security. In particular, the packets that are forwarded from one individual site to another are encrypted and carried in the payload of one or more packets traversing the public network. This placing of packets within another packet is referred to as tunneling. A VPN tunnel refers to two sites that securely exchange packets with one another by carrying encrypted versions of those packets within other packets using an agreed upon set of encryption algorithms and keys. With respect to routing within the Virtual Private Network, a tunnel operates, in concept, like the leased lines of the private network of FIG. 18.

Each private network site 1901, 1903, 1905, 1907 has a VPN server 1909, 1911, 1913, 1915, which performs the tunneling of VPN packets along with the associated cryptographic functions. A VPN client 1919 has the capability to establish a secure connection with any one of the VPN servers 1909, 1911, 1913, 1915.

Virtual private networks are attractive because the cost of one connection per site to a public network (which may be needed in order for the site's users to access hosts on the public network) is more economical than a leased line type connection into a private network. In addition, given today's security concerns, users are finding VPNs to be a reliable security solution, in large part, because VPN protocols (such as IPSEC) provide significantly higher security using advanced encryption technology than what is supplied by conventional private networks. VPN tunnels do not allow the service providers to view the packets within the VPN tunnel; in contrast, "leased line" service providers can examine the data carried over the leased line.

For interoperability reasons, private networks are often implemented using the TCP/IP (Transmission Control Protocol/Internet Protocol) protocol suite. However, this popular protocol suite possesses a number of drawbacks. The performance short-comings relate to the TCP protocol itself, which was designed during the infancy of data communications in which the data network were unreliable. These drawbacks include TCP Slow Start, TCP Connection Establishment, limited Maximum Window Size, Go-Back-N ARQ (Automatic Repeat Request), and Discarded Packet Congestion Control. TCP Slow Start is a congestion avoidance algorithm that limits TCP throughput on connections that have recently been established. TCP Connection Establishment has the drawback of requiring a full-round trip prior to allowing user data to flow. The default maximum window size (which is typically 64 KB) limits peak throughput of a TCP connection. The lost packet recovery algorithm uses a Go-Back-N scheme, which has significant negative performance impact when operating on a high-bandwidth delay connection. In addition, most TCP/IP networks handle congestion by discarding packets, which results in very inefficient Go-Back-N retransmissions; and the TCP implementations severely restrict their window sizes on discovering packet loss, thereby severely reduces throughput.

Furthermore, TCP operates relatively inefficiently, with respect to bandwidth utilization. These inefficiencies include Excessive ACK (Acknowledgement) Packets, and lack of compression. Most TCP implementations provide a TCP ACK for either every received TCP segment or for every other TCP received segment. The ACK traffic, thus, consumes a significant amount of bandwidth. Furthermore, because TCP does not provide data compression, greater bandwidth is needed. The above performance hindrances are particularly pronounced over high-bandwidth high-delay networks, such as geosynchronous communication satellite networks and over highly asymmetric networks.

Accordingly, there is a clear need for improved approaches for enhancing the performance of private networks to support secure communications. There is also a need for an approach to selectively provide performance enhancing functions in a secure environment. There is also a need to minimize development and implementation costs. There is also a further need to interoperate with existing standards and protocols.

Some Example Embodiments

The present invention addresses the above stated needs by providing an approach for integrating Virtual Private Network (VPN) and network acceleration techniques (e.g., Performance Enhancing Proxying (PEP) functions) in which a VPN tunnel can be segmented to selectively provide PEP functionality. A PEP peer can include any combination of the following components: a routing module, a buffer management module, an event management module, a parameter management module, a Transmission Control Protocol (TCP) spoofing kernel, a backbone protocol kernel, a prioritization kernel, a path selection kernel, and a data compression kernel. PEP peers can establish a PEP connection to support the PEP function for any portion of the VPN tunnel, particularly, the portion that traverses a high latency network. This approach advantageously supports secure communications, while enabling a service provider to implement the PEP function and VPN function independently throughout the network, thereby reducing costs and improving flexibility.

According to one aspect of the present invention, a method of providing secure communication services is disclosed. The method includes supporting a secure tunnel from a source node over a network to a destination node, wherein the nodes are external to the network. The method also includes establishing a connection that supports a mechanism for enhancing performance of the network for a portion of the secure tunnel that traverses the network. According to another aspect of the present invention, a network device for supporting security in a communications network is disclosed. The device includes a security peer configured to support a secure tunnel from a source node over a network to a destination node, wherein the nodes are external to the network. The device also includes a network performance peer configured to establish a connection for enhancing performance of the network for a portion of the secure tunnel that traverses the network. According to another aspect of the present invention, a network device for supporting security in a communications network is disclosed. The device includes means for supporting a secure tunnel from a source node over a network to a destination node, wherein the nodes are external to the network. The device also includes means for establishing a connection for enhancing performance of the network for a portion of the secure tunnel that traverses the network. According to another aspect of the present invention, a method of providing a virtual private network (VPN) service over a high latency network is disclosed. The method includes establishing a VPN tunnel over the network. Additionally, the method includes selectively establishing a connection over a segment of the VPN tunnel, wherein the connection supports performance enhancing proxying functions to minimize impact of the latency of the network. According to yet another aspect of the present invention, a method of providing secure communication services is disclosed. The method includes establishing a plurality of secure segments along a common communication path traversing a network. The method also includes establishing a connection that supports a mechanism for enhancing performance of the network, wherein the connection exists between two of the secure segments.

Further, in accordance with example embodiments of the present invention a method of providing secure communication services is disclosed. The method comprises establishing a secure data tunnel from a source node to a destination node via a plurality of secure segments across a data communications network. The method further comprises establishing a data path via the secure data tunnel, wherein the data path supports a performance enhancing mechanism that improves performance of data communications over the data path. The performance enhancing mechanism multiplexes data packet flows from the source node for transmission over the data path, and performs one or more of connection startup latency reduction, acknowledgment message spoofing, window sizing adjustment, compression and selective retransmission. According to a further example embodiment, the establishment of the data path via the secure data tunnel comprises determining that the data packet flows are to be carried via a secure connection, determining that the plurality of secure segments across the data communications network are functioning properly, and establishing the data path via the secure data tunnel and initiating the performance enhancing mechanism. By way of example, the secure data tunnel may consist of a virtual private network (VPN) tunnel formed by the plurality of secure segments across the data communications network. By way of further example, at least one of the data packet flows may be generated in accordance with transmission control protocol (TCP)/Internet protocol (IP) data communications protocols. By way of further example, the data path may comprise a plurality of data sub-paths, wherein each data sub-path corresponds to a different priority level configured to carry data packets of the respective priority level—wherein each data packet flow may be assigned to a one of the sub-paths based on one or more predetermined priority assignment rules. The predetermined priority assignment rules, for example, may be based on criteria corresponding to the data packet flows, wherein the criteria comprise one or more of destination IP address, source IP address, source port number, destination port number, user datagram protocol (UDP) source port number, UDP destination port number, type of service (TOS), and data type. By way of further example, the capacity of the data path is apportioned between the data sub-paths based on one or more predetermined priority capacity assignment rules.

Further, in accordance with example embodiments of the present invention an apparatus comprises a security peer configured to establish a secure data tunnel from a source node to a destination node via a plurality of secure segments across a data communications network, and a network performance peer configured to establish a data path via the secure data tunnel, and to operate a performance enhancing mechanism. The performance enhancing mechanism is configured to multiplex data packet flows from the source node for transmission over the data path, and to improve performance of data communications over the data path. By way of example, the performance enhancing mechanism is configured to improve performance of data communications over the data path by performing one or more of connection startup latency reduction, acknowledgment message spoofing, window sizing adjustment, compression and selective retransmission. According to a further example embodiment, the establishment of the data path via the secure data tunnel comprises determining that the data packet flows are to be carried via a secure connection, determining that the plurality of secure segments across the data communications network are functioning properly, and establishing the data path via the secure data tunnel and initiating the performance enhancing mechanism. By way of example, the secure data tunnel may consist of a virtual private network (VPN) tunnel formed by the plurality of secure segments across the data communications network. By way of further example, at least one of the data packet flows may be generated in accordance with transmission control protocol (TCP)/Internet protocol (IP) data communications protocols. By way of further example, the data path may comprise a plurality of data sub-paths, wherein each data sub-path corresponds to a different priority level configured to carry data packets of the respective priority level—wherein each data packet flow is assigned to a one of the sub-paths based on one or more predetermined priority assignment rules. The predetermined priority assignment rules, for example may be based on criteria corresponding to the data packet flows, wherein the criteria comprise one or more of destination IP address, source IP address, source port number, destination port number, user datagram protocol (UDP) source port number, UDP destination port number, type of service (TOS), and data type. By way of further example, the capacity of the data path may be apportioned between the data sub-paths based on one or more predetermined priority capacity assignment rules.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A system, method, device, and software for providing integrated VPN and PEP components are described. In the following description, for the purposes of explanation, numerous specific details are set forth in order to provide a thorough understanding of the present invention. It is apparent, however, to one skilled in the art that the present invention can be practiced without these specific details or with an equivalent arrangement. In other instances, well-known structures and devices are shown in block diagram form in order to avoid unnecessarily obscuring the present invention.

Although the various embodiments of the present invention are described with respect to an IP (Internet Protocol)-based network and a satellite network, it is recognized that other equivalent networks can be employed. In addition, it is contemplated that various network acceleration techniques, other than PEP functions, can be applied.

I. Integrated VPN and Network Acceleration

Figure 1:
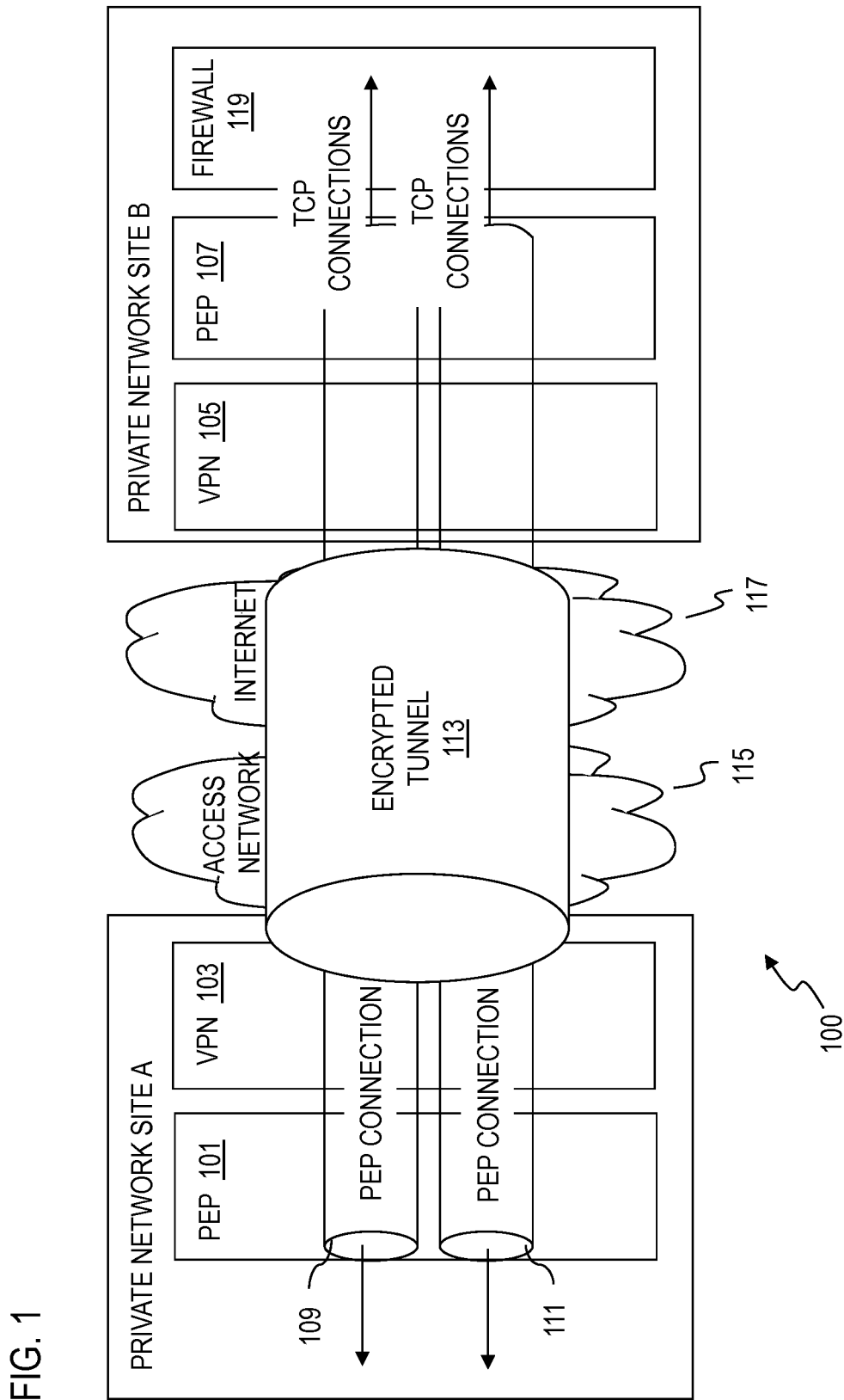
FIG. 1 is a diagram of Virtual Private Network (VPN) peers integrated with respective Performance Enhancing Proxying (PEP) peers, according to an embodiment of the present invention.

FIG. 1 is a diagram of Virtual Private Network (VPN) peers integrated with respective Performance Enhancing Proxying (PEP) peers, according to an embodiment of the present invention. Enterprises, such as a large business or organization, rely on VPN technology for interconnecting multiple sites and hosts to their networks. Additionally, these enterprises may require use of specialized access networks, such as geosynchronous satellite networks, which can conveniently interconnect sites without much concern over geographic location or availability of terrestrial networking infrastructure. These enterprises further seek to obtain the benefits of the PEP mechanism, which are detailed below with respect to FIGS. 5 and 6. As noted previously, this goal cannot be readily realized with conventional configurations, in part, because the VPN technology encrypts the packets (including their headers), such that the PEP technology residing within the access network, for example, within its terminals and the access gateway, is no longer able to interpret or edit those packets.

An enterprise network 100, according to one embodiment of the present invention, supports integration of PEP technology with VPN technology. In this example, private network site A of the enterprise network 100 includes a PEP peer (or end-point) 101 interacting with a VPN peer 103 to provide an integrated PEP and VPN function. The VPN peer 103 has a corresponding peer, VPN peer 105 within private network site B; similarly, a PEP peer 107 corresponds to the PEP peer 101 of the private network site A. As arranged, the PEP peers 101, 107 have access to the packets prior to encryption by VPN peers 103, 105 (as shown in FIG. 1). Alternatively, the PEP peers 101, 107 can reside between the VPN peers 103, 105. As shown, PEP peer 101 and VPN peer 103 are situated within private network site A, while their respective peers are located at private network site B.

The VPN peers 103, 105 "tunnel" the PEP connections 109, 111 by establishing an encrypted tunnel 113 (e.g., VPN tunnel) to encrypt the private network packets carried by the PEP connections 109,111 over the access network 115 and a public network 117 (e.g., the Internet). The packets are completely protected in that they only appear in the clear within the customer's premises (at the private network sites A and B), and thus are not viewable by any network element between the VPN peers 103, 105, including the access network and public network providers.

As discussed, the PEP functionality (via the PEP peers 101, 107) can be implemented at the private network site "outside" of the VPN tunnel 113, in accordance with an embodiment of the present invention. "Outside" in this context means that packets leaving the site are processed by the respective PEP peers 101, 107 prior to being encrypted by the VPN peers 103, 105 and that packets entering the site are processed by the PEP peer 101, 107 after these packets have been decrypted by the VPN peers 103, 105.

The PEP peer to VPN tunnel routing is performed, in an example embodiment, by a routing table, where this routing table identifies the VPN tunnel and its VPN peer's IP address and provides one or more IP address masks such that one of which matches the IP address of the PEP peer. This routing table thus is able to route PEP backbone packets through the appropriate tunnel to the PEP peer. Additionally, the routing information can be dynamically created as part of the VPN tunnel establishment or can be completely configured by an operator and loaded into the VPN peers 103, 105 or adjusted by an operator directly via an operator interface or can be partially configured and the address masks dynamically learned by a routing protocol.

Fixed, "always on" connectivity can be supported by the enterprise network 100, such that both the VPN connections and the PEP connection(s) 109, 111 between the sites A and B are not torn down once established; that is, these connections are created when the PEP peers 101, 107 and the VPN peers 103, 105 are activated and are pinned-up so long as the PEP peers 101, 107 and the VPN peers 103, 105 are "ON" and are able to communicate with each other.

In the event of a network failure or the failure of one of the components 101, 103, 105, 107, which implements an end point of the VPN connection or PEP connection, the components 101, 103, 105, 107 immediately and continuously attempt to bring back up the connections upon detection of the failure. Under this scenario, coordination between bringing up the VPN connection and the PEP connection is not strictly required, as these activities can be independent. However, attempting to bring up the PEP connection prior to the establishment of the VPN connection can waste processor resources and, potentially, network bandwidth resources, in that sending PEP messages to re-establish the PEP connection is futile until the VPN connection is established.

The integration of the PEP and VPN functionality, as provided by an embodiment of the present invention, mini-mizes waste of these resources. According to one embodiment of the present invention, the VPN function, as supported by the VPN peers 103, 105, provides status information to the PEP function (PEP peers 101, 107) whenever the state (e.g., connection up, or connection down) of the VPN connection changes. At startup, the PEP peers 101, 107 do not attempt to bring up the PEP connections 109, 111 until informed by the VPN peers 103, 105 that the VPN connection has been successfully established. In addition, if the VPN connection fails, for example, because communication between the two sites A and B is interrupted by a network failure (either in the access network 115 or the public network 117), the PEP peers 101, 107 bring down the PEP connections 109, 111 when the VPN peers 103, 105 provides notification of the VPN connection failure. In addition to preventing waste of resources by futile attempts to send PEP messages, this approach also allows the PEP function to gracefully terminate any TCP connections being carried by the PEP connections 109, 111. Without this integration of the PEP and VPN functionality, termination would be delayed, whereby a user's applications may be suspended until a PEP connection timeout occurs, signaling the detection of the failed communication path.

As shown, the private network site B can utilize a firewall 119 that is integrated with the PEP peer 107. Irrespective of whether the site B behaves as a VPN client or server, it is recognized that the PEP functionality needs to be situated between the VPN peer 105 and the firewall 119, thereby ensuring that the firewall 119 can access the unencrypted data. This arrangement also permits the firewall 119 to have access to the data after the packet has been restored back to native TCP so that the firewall 119 can properly provide access control checking on the restored TCP connections and packets. Specifically, the firewall 119 controls the types of packets entering and leaving the PEP peer 101, using a number of methods, including packet filtering, proxy service, and stateful inspection, for example. The firewall 119 can apply various filters, which can be based on IP address, domain name, communication protocol, and port, for example.

Figure 4:
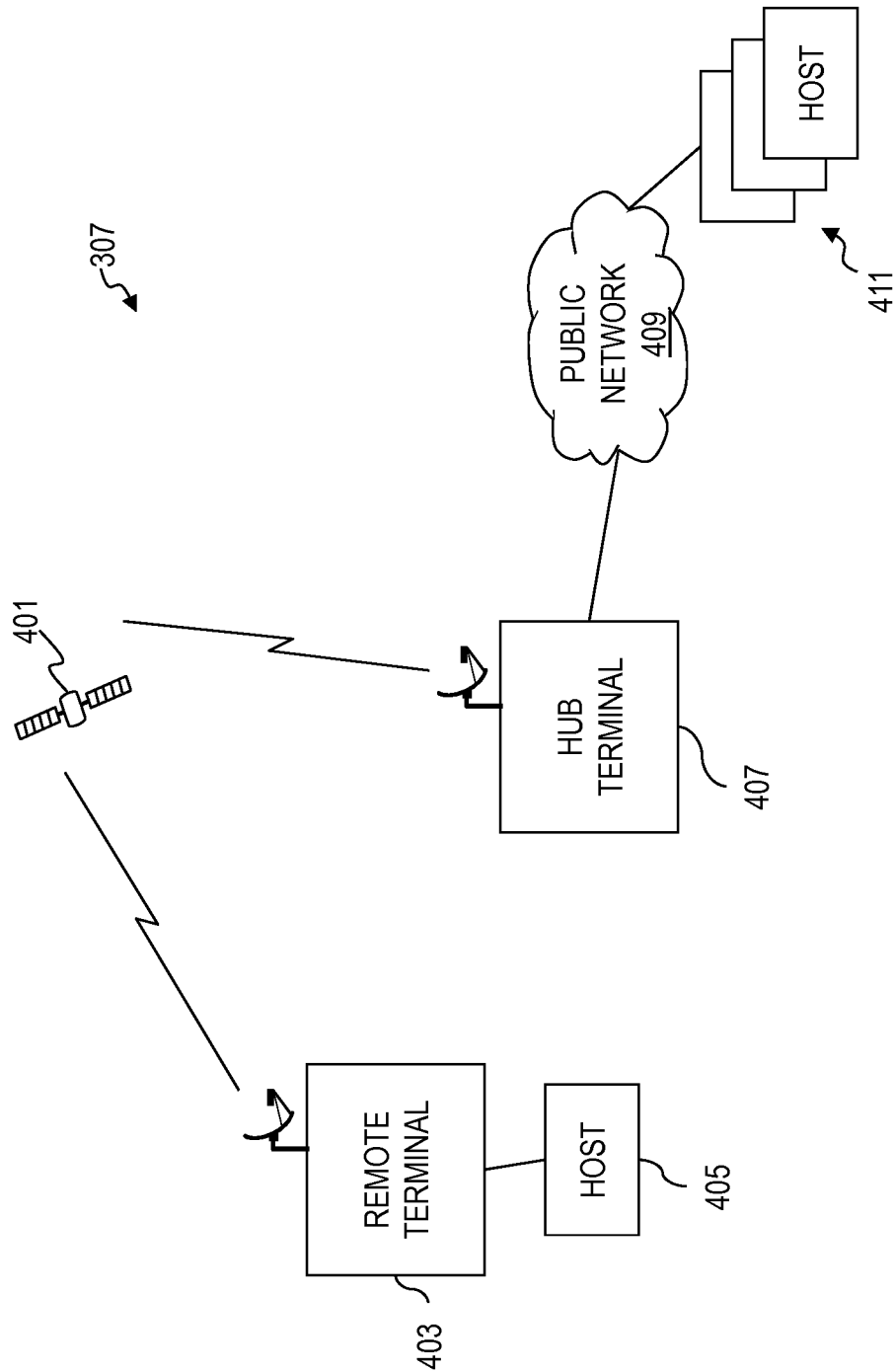
FIG. 4 is a diagram of an example access network utilized in the system of FIG. 3.

It is noted that fixed, "always on" connectivity can be provided for administrative or resource reasons, such that it is desirable for the PEP connection 109, 111 to not be "always on," even though the VPN connection is "always on." An example scenario in which such an arrangement is desirable is shown in FIG. 4 and involves a Very Small Aperture Terminal (VSAT) satellite network with a hub terminal (or hub site) that supports thousands (or even hundreds of thousands) of remote terminals (or remote sites). Permanent PEP connections between the hub site and all of the remote sites require sufficient resources at the hub site to support all of these PEP connections at the same time. However, a remote site may only be active (i.e., passing traffic across the network) at different times and only some of the time. In such a case, it is desirable (e.g., for cost reasons) to limit the resources required for PEP connections at the hub site to only sufficient resources to support the maximum number of remote sites that may be active at the same time. In support of this requirement, the PEP function, as performed by the PEP peers 101, 107, supports the ability to bring up the PEP connection when triggered by the need to carry a TCP connection (session or stream) between the two sites over a secure (or encrypted) tunnel, as described below in FIG. 2.

Figure 2:
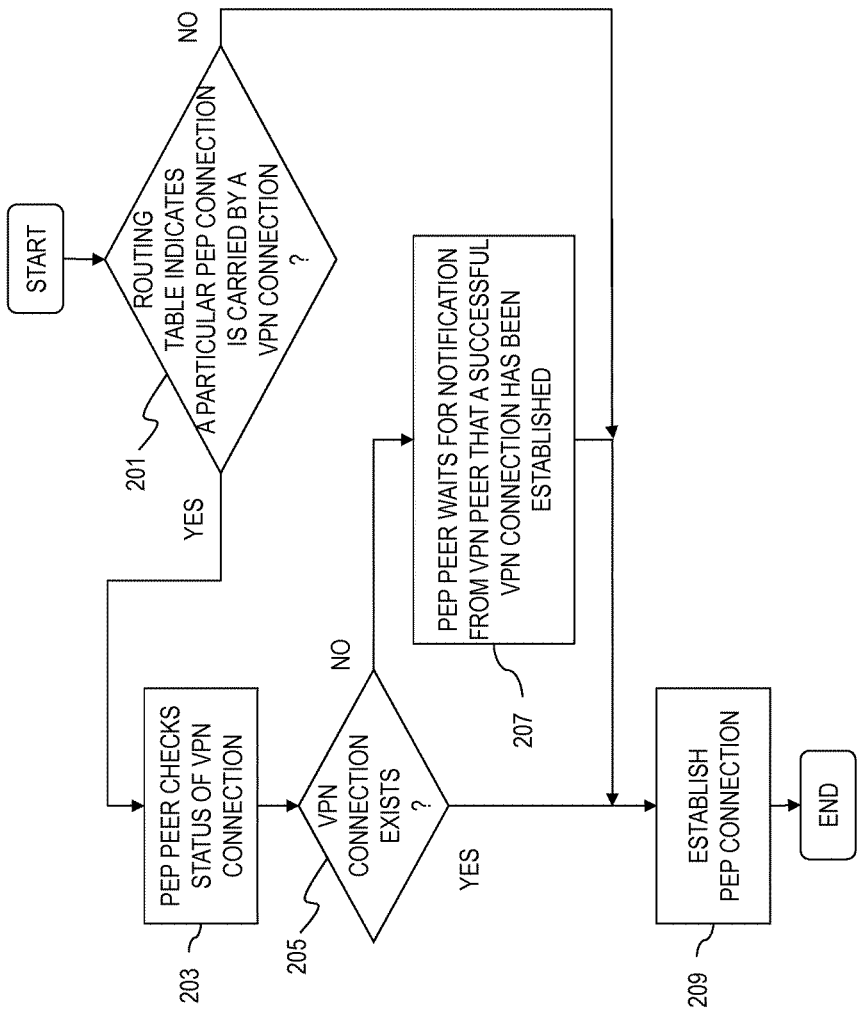
FIG. 2 is a flowchart of a process for establishments of a PEP connection and VPN connection, according to an embodiment of the present invention.

FIG. 2 shows a flowchart of a process for establishments of a PEP connection and VPN connection, according to an embodiment of the present invention. It is noted that network acceleration can be performed without the need for a secure environment. That is, not every PEP connection has to be carried over a VPN tunnel. In step 201, a determination is made whether a particular PEP connection is supported over a VPN connection by consulting, for example, a routing table. Use of the routing table is more fully described later with respect to FIG. 12. With the integration of the PEP function and VPN function provided by an embodiment of the present invention, the PEP function, prior to actually attempting to bring up the PEP connection, checks the current status of the VPN connection, as in step 203. Next, the PEP peer 101, 107 determines whether a VPN connection exists (step 205). If no VPN connection exists, then the PEP peer 101, 107 waits for notification from the VPN 103, 105 that a successful VPN connection has been established (step 207). If the VPN connection is up, the PEP connection is established, per step 209.

Continuing with the example of a VSAT network, if a remote is not always active, the likely scenario is a desire to also not have the VPN connection active when it is not needed since VPN connections also consume network and computing resources. In support of this option, the present invention, according to one embodiment, also includes the capability for the PEP function to trigger the setting up of the VPN connection, similar to the way traffic triggers the setting up of the PEP connection. The network 100, in an example embodiment, has the capability to selectively configure the VPN peers 103, 105 and the PEP peers 101, 107 to support a permanent VPN connection and/or a permanent PEP connection. It is noted that a permanent PEP connection cannot be truly permanent unless the VPN connection is permanent. Configuring the PEP connection as permanent, however, even when the VPN connection is not permanent allows the network 100 to effectively implement the capability of the PEP function to be triggered by the VPN function. Therefore, if no VPN connection exists, then, per step 207, the PEP peer 101, 107 waits for the VPN peer 103, 105 to notify it of the success or failure of VPN connection establishment via a status query mechanism; when the VPN connection is successfully established, the PEP function proceeds to establish the PEP connection. In other words, for example, the VPN peer 103 can communicate status information to the PEP peer 101 continually (on an automatic basis) or upon submission of a query by the PEP peer 101.

This flexibility advantageously permits the service provider to trade the cost of the infrastructure required to support permanent VPN and PEP connections against the potential increase in service revenue possible by providing the permanent connections to eliminate the initial latency experienced by the user when the user first becomes active.

When a PEP connection 109, 111 is not ready when user traffic starts, either because the PEP connection 109, 111 is not permanent or because the PEP function is waiting for the VPN connection to establish, the network 100 can make use of the PEP functionality, for example, to spoof the TCP three-way handshake, if desired. Accordingly, this mechanism prevents a host (e.g., user's PC (Personal Computer) or other client, such as a Personal Digital Assistant (PDA)) from timing out, while the VPN (if necessary) and PEP connections are being established.

Figure 3:
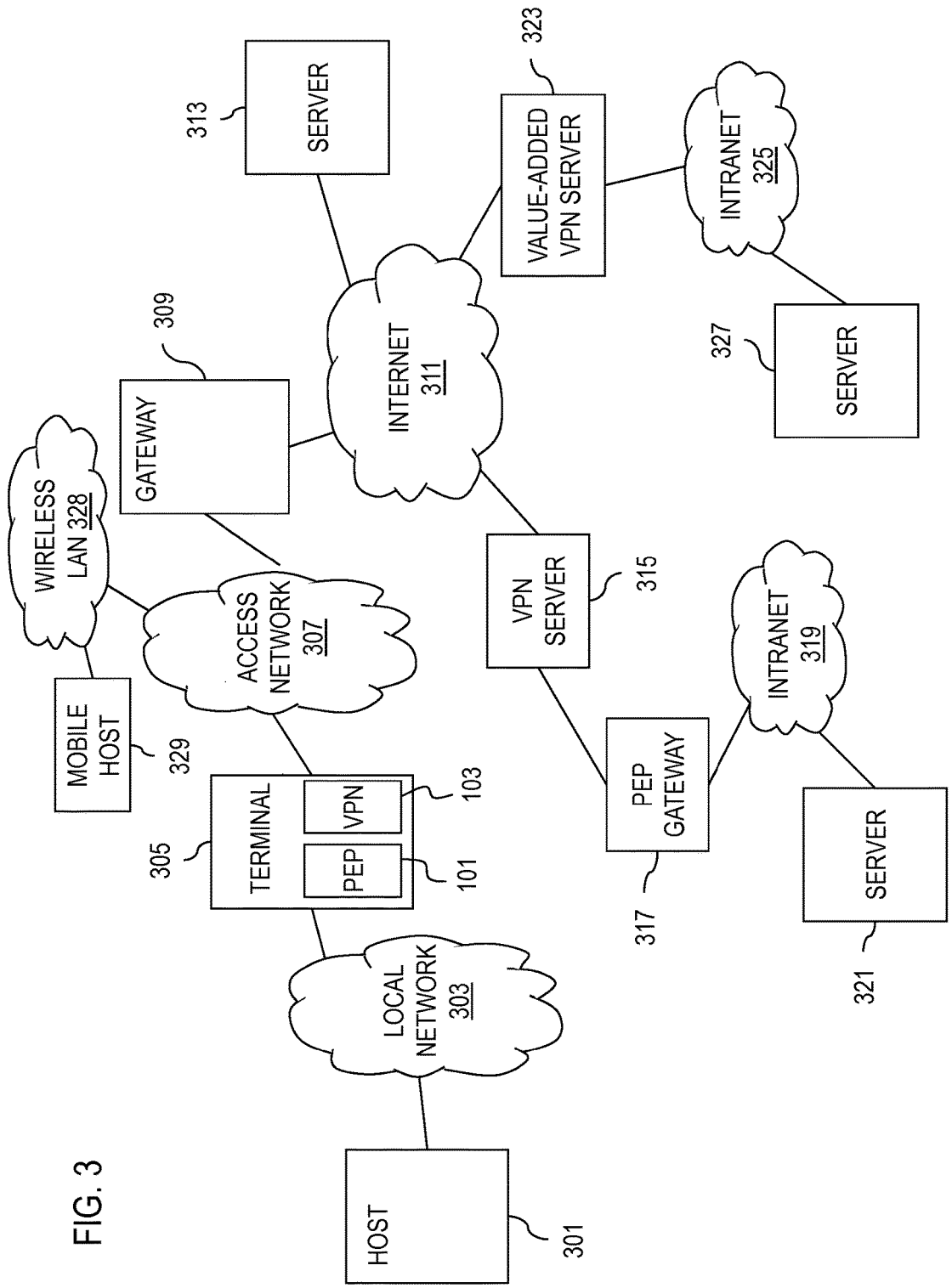
FIG. 3 is a diagram of an example communications system capable of employing integrated VPN and PEP technologies, according to an embodiment of the present invention.

FIG. 3 is a diagram of a communications system capable of employing integrated VPN and PEP technologies, according to an embodiment of the present invention. As seen in the figure, a host 301 attaches to a local network 303, which has connectivity to a terminal 305. The terminal 305 serves an access terminal to an access network 307. A gateway 309 exists to connect the access network 307 to the Internet 311 (or any public packet switched network). The Internet supports a server 313, which can be a web server, for example.

A VPN server 315, which provides VPN functionalities, communicates with a performance enhancing proxying (PEP) gateway 317. The VPN server 315 can support multiple VPN tunnels; typically, one tunnel is employed per private network site. In an example embodiment, the VPN server 315 can be integrated with a router to connect to the Internet 311 for routing packets across one or more VPN tunnels over the Internet 311.

The PEP gateway 317 has connectivity to an intranet 319, in which a server 321 is a part of the network 319. Additionally, a value-added VPN server 323 supports one or more value-added services, such as PEP, quality-of-service (QoS), policy control, etc., as detailed with respect to FIG. 8. The value-added VPN server 323 is attached to an intranet 325, which has a server 327 storing content that may be of interest to the host 301.

In addition, a variety of host-to-host connectivity configurations can be supported by the system of FIG. 3, for example, including VPN and PEP functionality in each host; VPN and PEP functionality in the terminals in front of each host; and VPN and PEP functionality in one host and in the terminal of the other host. As will be explained more fully in FIGS. 7-16, the PEP function and the VPN function can be implemented in numerous ways among the network elements.

The PEP gateway 317 and the VPN server 315 can support PEP and VPN connections that are not "always on." For example, a "hot spot" access point (e.g., a wireless local area network 328), provided as a service in public areas such as airport lobbies, libraries, etc., can be used by a mobile host 329 (e.g., user's PC or other client) to login in across the access network 307 to the user's company intranet 319 to retrieve information from the server 321. Connectivity to the access point can be wireless. In such a case, security can be provided from the mobile host 329 back to the company intranet 319. Because the user's traffic is exposed by the wireless network (328), security cannot just be provided from the access point to the intranet 319. And, even in the case of a wired connection, because the access point is located in a public place, the user has no assurance that the "wire" is not tapped or otherwise compromised. However, because the mobile host 329 can be equipped with VPN functionality, the communication is secured, irrespective of whether the access is wired or wireless.

By integrating the PEP function and the VPN function, the present invention, according to one embodiment, can employ the PEP function into the mobile host 329 (e.g., PC, PDA, etc.), essentially external to the VPN connection. Under this arrangement, the user's traffic remains secure, as the PEP function does not need to expose the user traffic to gain the benefit of VPN functionality.

In this environment, both the VPN and PEP connections will not be permanent, by definition. The integration of the PEP function and the VPN function provides several options for configuring the method used to establish the PEP and VPN connections. One method, which is consistent with how VPN connections are traditionally established, involves the user explicitly requesting that the VPN connection be established, for example, by starting up the VPN client on the mobile host 329. According to one embodiment of the present invention, this functionality is extended to also bring up the PEP connection after the VPN connection has been established, as explained earlier with respect to FIG. 2.

An alternative method of establishing the PEP and VPN connections involves the user generating traffic to automatically invoke the PEP function as to trigger the creation of the VPN connection and the PEP connection. Conventionally, this approach is not viable because the user's connection will time out while waiting for the VPN connection to establish. The TCP connection spoofing provided by the PEP function according to an embodiment of the present invention, however, will keep the TCP connection from timing out while the VPN and PEP connections are established.

Example VPN standards include IPSEC (IP Security Protocol), Layer 2 Tunneling Protocol (L2TP), and Point-to-Point Tunneling Protocol (PPTP). IPSEC is a standard for Virtual Private Networking, which has been developed by the Internet Engineering Task Force (IETF) and has been endorsed by many industry experts as providing a high level of security. The IPSEC protocol encompasses a number of standards and Request for Comments (RFCs) by the Internet Engineering Task Force (IETF). For instance, these RFCs include RFC 2401-2411 and 2451 (which are incorporated herein by reference in their entireties). Notably, IPSEC introduces new headers between the IP header and the Transmission Control Protocol (or User Datagram Protocol): an Authentication header (AH), and an Encapsulating Security Payload (ESP). The high level of security stems, for example, from the fact a network service provider is not able to view the data and other encryption protocol standards are less mature (i.e., have not been well studied or tested).

II. Satellite Access Network

FIG. 4 is a diagram of an example access network utilized in the system of FIG. 3. An access network 307 provides individual hosts 405 (of which only a single host is shown) or whole sites with connectivity to a public network 409 (and the hosts 411 accessible on that network), such as the Internet. It is recognized that when the access network 307 is configured as a wireless network, the network 307 provides direct communication from terminal to terminal, but typically routes data destined for the public network 409 through a gateway-type device. In the case of a VSAT system, the access network 307 provides connectivity via a satellite 401 between a remote terminal 403 and a hub terminal 407. The hub terminal 407, in this example, serves as a gateway to the public network 409.

Under this satellite environment, use of the integrated PEP and VPN functions permits a PEP connection to be "always on" to minimize the impact of the latency of the network 307, even though no VPN connection is established (as discussed earlier).

The network 307 can be implemented as other wireless systems (e.g., radio networks, cellular networks, etc.). For example, the network 307 can be a third generation mobile phone system; in this scenario, host 405, which executes a TCP/IP stack to access the public network 309 can be integrated with the terminal 403. Alternatively, a local area network (not shown) can provide connectivity for one or more hosts 405 to the terminal 403.

Furthermore, the host 405, according to another embodiment of the present invention, can be connected to the terminal 403 via a peripheral interface such as a Universal Serial Bus (USB) interface or an RS-232 interface in a manner that the terminal 403 is a peripheral of the host 405.

The access network 307, in an example embodiment, supports internetworking using the TCP/IP stack. Given the many drawbacks that inhere in TCP, a Performance Enhancing Proxying (PEP) mechanism is utilized to reduce or minimize these drawbacks, particularly in a satellite communication system.

III. Network Acceleration Functions

Figure 5:
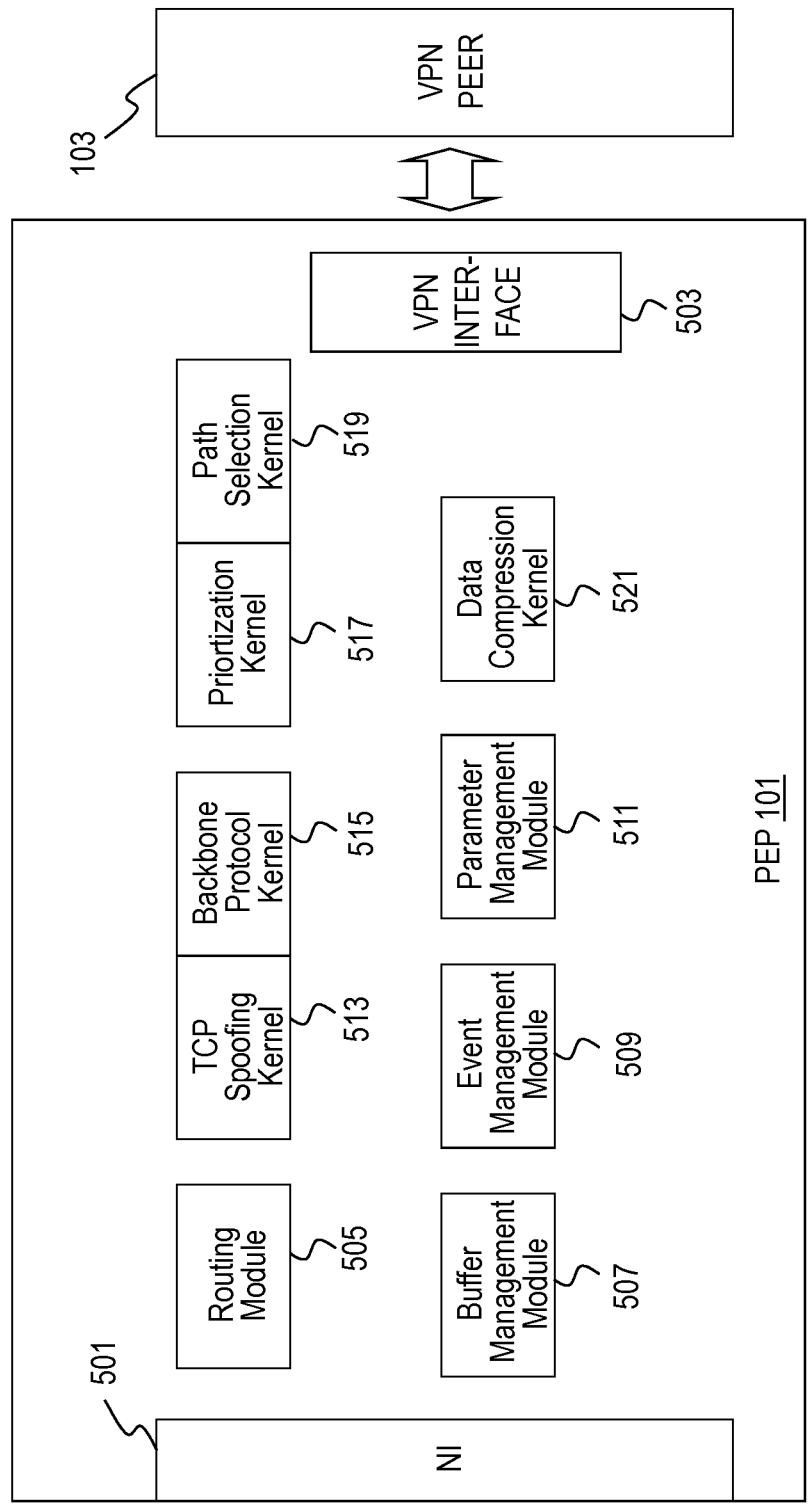
FIG. 5 is a diagram of example PEP functionality employed in the system of FIG. 1, according to one embodiment of the present invention.

FIG. 5 is a diagram of example PEP functionality employed in the system of FIG. 1, according to one embodiment of the present invention. In this embodiment, the PEP peer 101 (as well as the PEP peer 107 of FIG. 1) is implemented, for example, in a platform environment, which includes the hardware and software operating system. The PEP peer 101 uses a network interface 501 to exchange TCP packets with the host 301 (FIG. 3). Also, the PEP peer 101 utilizes the interface 503 to establish and maintain backbone connections, for instance, with the value-added VPN server 323 via the VPN peer 103. The PEP peer 101 uses the network interface 501 to exchange TCP packets with the host 301 (FIG. 3). Also, the PEP peer 101 utilizes the VPN interface 503 to establish and maintain backbone connections, for instance, with the value-added VPN server 323 via the VPN peer 103. The PEP peer 101 can be deployed strictly as a software (or firmware) module, encompassing some or all of the following components, which are detailed below: a routing module 505, a buffer management module 507, an event management module 509, a parameter management module 511, a TCP spoofing kernel 513, a backbone protocol kernel 515, a prioritization kernel 517, a path selection kernel 519, and a data compression kernel 521.

The PEP peer 101 intercepts a TCP connection's packet and locally acknowledges that packet and then transports the packet to its PEP peer 107 via a protocol which is designed in such a way as to overcome and/or reduce the limitations of conventional TCP/IP networks. The optimized protocol is referred to as a "backbone protocol" and a "backbone connection" (or PEP connection) refers to this protocol connecting a pair of PEP peers 101, 107. As used herein, "backbone" connection denotes a PEP connection over an access network (e.g., network 307) that can serve as a backbone network; however, because a PEP connection can be established between PEP peers 101, 107 over any type of network, the term "PEP connection" is used synonymously with "PEP backbone connection" or "backbone connection."

The optimized protocol can be a protocol that resembles TCP, but which relaxes TCP's performance inhibitors, such as TCP slow start, default small window size, and frequent sending of acknowledgement packets. This approach is detailed in U.S. Pat. No. 6,161,141 to Dillon, entitled "Network System with TCP/IP protocol Spoofing," which is incorporated herein in its entirety. In such a case, each TCP connection corresponds to a single PEP backbone connection.

Alternatively the optimized protocol can differ from TCP and include capabilities not present in TCP, such as compression, selective retransmission and etc. In this arrangement, a single PEP backbone connection can be assigned to each TCP connection, or a single backbone connection can multiplex data from multiple TCP connections.

Under certain circumstances, more than one backbone connection exists between two PEP peers and is used to prioritize TCP connections so that higher-priority TCP connections can receive a preferred throughput or response time quality of service compared to lower-priority connections. Optimization of PEP connections that traverse different types of networks can be achieved via configuration or via dynamic determination of network characteristics, such as latency and maximum throughput, by the PEP peers 101, 107.

A. Automatic Tuning to Network Characteristics

According to an embodiment of the present invention, the PEP functions of the PEP peers (or end points) 101, 107 can be performed adaptively. As noted, the performance of PEP is controlled by several parameters, including backbone protocol window size, TCP window size, ACK delay and retransmission delay. These parameters can be configured in advance. However, if multiple connections are to be supported, the memory is shared between the connections. The memory can either be statically allocated to a pre-configured maximum number of connections, or dynamically allocated to connections as needed. For the purposes of explanation, the adaptive capability of the PEP functions is described with respect to window sizes. Window size determines maximum throughput and is dependent on the available memory in the end points.

Dynamic allocation is more complex and can potentially lead to over-commitment of resources and loss of data. The ACK delay helps to reduce the number of acknowledgements and thus the bandwidth required for acknowledgements. However, increasing the delay increases the end-to-end latency. The retransmission delay depends on queue latency and end-to-end latency and helps to determine when the link has failed. If it is too large, the application will seem slow when packets are lost because of the long period before retransmission. However, the delay should be of sufficient duration to account for the end-to-end latency including the ACK delay.

If the PEP peers 101, 107 are implemented in a well-defined network, e.g., a satellite network of FIG. 4 with a fairly static number of hosts or users at each end point, the PEP parameters can be calculated and statically configured. That is, since the channel throughput and approximate number of users is known, the expected number of connections can be estimated and the window size can be calculated and configured. The network latency is known and so the ACK delay and retransmission interval can be calculated.

If PEP is implemented in a (mobile) host or in the end point of a network with unknown delay and unknown throughput, it may be difficult to configure the PEP parameters. It is particularly hard to pre-configure delay parameters if the delay is unknown and may be highly variable; e.g., in a mobile host that is used at different times on satellite networks and terrestrial networks. Therefore, in this scenario the parameters need to be controlled automatically by the end point based on measurements of the network, or explicit notifications from the network. The algorithm needs to know the throughput and round trip time (RTT). RTT can be estimated, for example, at connection start up or constantly monitored throughout the connection. Throughput can be estimated by the user or measured and then parameters adjusted.

Alternatively, if the network can indicate RTT and throughput (or bandwidth) through a Quality-of-Service (QoS) indication, these can be used to configure the parameters. An appropriate protocol can be implemented to allow the PEP peer 101 to query the network for information about the communication path, for example, RTT and throughput. If the network supports this protocol, it responds. Otherwise the PEP peer 101 will not receive a response and so falls back to a default configuration after some timeout expires.

After an initial value is determined, the RTT can be estimated during data transfer by a number of methods. The most recent RTT estimate can be used to adjust PEP parameters as necessary, e.g. increase the window as RTT increases.

The PEP peer 101 starts with an estimation of throughput—either based on explicit notification from the network in the response message, or based on a default value, or a user controlled value, e.g. when the user knows the configuration of the network. The transmitter can probe to see if the available throughput is higher than the current estimate, i.e., try to push more data. If congestion occurs, e.g. the actual bandwidth is lower, or the network indicates congestion; the transmitter "shrinks" its backbone connection window. This is similar to the operation of TCP, which uses a mechanism called "multiplicative decrease." If data is lost, it assumes this is due to congestion and it reduces its window (congestion window) by half.

Alternatively receiver based tuning can be performed to enhance the network performance. The receiver can control the PEP backbone protocol receive window. Again the window is initially set based on either explicit notification from the network in the response message, or based on a default value, or a user controlled value. The receiver can increase the window in an attempt to increase throughput and shrink the window it if congestion is detected. The receiver can use information provided by the network, e.g., queue latency indication from the network as implemented in a satellite gateway, or explicit congestion notification (ECN) from network routers. IETF RFC 2481, which is incorporated herein by reference in its entirety, describes a technique for adding Explicit Congestion Notification (ECN) to IP, whereby routers set a bit called Congestion Encountered (CE) in the Type Of Service (TOS)/Differentiated Services (DS) field of the IP header to indicate congestion. This can be forwarded on to the receiver by routers in the network.

It may be advantageous to have the receiver perform congestion control rather than the transmitter. In certain network configurations, there may not be a path back to the transmitter; e.g., one-way or asymmetric networks. In a VPN environment, there may be a security issue where the server side might not accept information from the network. With explicit congestion notification (ECN), the receiver may have a better indication of congestion than the transmitter. It is recognized that the receiver should pass the indication back to the transmitter, but clearly the receiver has the better view. Different PEP peers may be running different versions of software with various functions, such that the transmitter might not support these functions.

The selection of receiver based tuning or transmitter based tuning can be negotiated by the PEP peers 101, 107 when the PEP connection is established. Each PEP peer 101 can indicate whether it has access to congestion information to help decide. Depending on the network, the PEP peers 101, 107 could use the methods concurrently, singly, or in combination.

The above tuning operation as described focuses on the window sizes. However other parameters such as ACK delay and retransmission delay could also be tuned as necessary based on the estimation of RTT and detection of congestion.

While various embodiments of the present invention have been explained with respect to the TCP protocol, other protocols can similarly have their performance or efficiency improved by a suitable PEP. Another protocol that can be "PEPed" for performance improvement is the Point-to-Point Protocol (PPP) (with the performance enhancement of its connection establishment) when operating over IP via protocols such as the Point-to-Point Tunneling Protocol (PPTP) and the Layer 2 Tunneling Protocol (L2TP). Compression, in particular, is applicable to many protocols. Accordingly, the various embodiments of the present invention are not limited to TCP PEP. Moreover, it is noted that the advantages of PEP, and network acceleration in general, stems from the recognition that the network acceleration technique needs to be "outside" of the VPN tunnel.

For example, in the system of FIG. 3, if the terminal 305 includes the PEP and VPN functionality, the terminal 305 establishes TCP connections with the IP host 301, via the network interface 501, and can establish backbone connection(s) with the value-added VPN server 323 via the network interface 503. The PEP peer platform environment 101 also can include general functional modules, such as routing module 505, buffer management module 507, event management module 509, and parameter management module 511.

As illustrated in FIG. 5, the PEP peer 101 also includes a TCP spoofing kernel 513, a backbone protocol kernel 515, a prioritization kernel 517, and a path selection kernel 519. These four kernels constitute the basic functionalities of the PEP peers 101, 107.

Although not shown, the PEP peer 101 performs a number of functions beyond the modules and kernels shown, such as shielding the various PEP kernels 513, 515, 517, 519 from implementation specific constraints. That is, the PEP peer 101 performs functions that the various PEP kernels 513, 515, 517, 519 cannot perform directly because the implementation of the function is platform specific. This arrangement has the advantageous effect of hiding platform specific details from the PEP kernels 513, 515, 517, 519, making the PEP kernels more portable.

An example of a platform specific function is the allocation of a buffer. In some platforms, buffers are created as they are needed, while in other platforms, buffers are created at start-up and organized into linked lists for later use. It is noted that platform specific functions are not limited to functions generic to all of the kernels 513, 515, 517, 519. A function specific to a particular kernel, for example, the allocation of a control block for TCP spoofing, can also be implemented in the PEP peer platform environment 101 to hide platform specific details from the kernel.

Additionally, the PEP peer 101 can provide the task context in which the PEP kernels 513, 515, 517, 519 run. In one example embodiment, all PEP kernels 513, 515, 517, 519 can run in the same task context for efficiency. However, this is not required.

Furthermore, the PEP peer platform environment 101, in an example embodiment, provides an interface between the PEP functionality (embodied in kernels 513, 515, 517, 519) and the other functionality of the network components. The PEP peer platform environment 101 can provide the interface between the PEP functionality and the routing module 505, as seen in FIG. 5. It is noted that the platform specific functions illustrated in FIG. 5 are examples and are not considered an exhaustive list. It is further noted that the PEP kernels shown adjacent to each other (513, 515 and 517, 519) in FIG. 5 can have a direct procedural interface to each other. Further, the kernels 513, 515, 517, 519 can include direct interfaces to improve performance, as opposed to routing everything through the PEP peer platform environment 101.

In addition to the PEP kernels 513, 515, 517, and 519, the PEP peer 101 can utilize a data compression kernel 521 to improve bandwidth efficiency. These kernels 513, 515, 517, 519, and 521, as described above, facilitate communication between the two groups of hosts, by performing a variety of performance enhancing functions, either singly or in combination. These performance enhancing functions include selective TCP spoofing, three-way handshake spoofing, local data acknowledgement, TCP connection to backbone connection multiplexing, data compression/encryption, prioritization, and path selection. Selective TCP Spoofing is performed by the TCP spoofing kernel 513 and includes a set of user configurable rules that are used to determine which TCP connections should be spoofed.

B. TCP Spoofing

Selective TCP spoofing improves performance by not tying up TCP spoofing-related resources, such as buffer space, control blocks, etc., for TCP connections for which the user has determined that spoofing is not beneficial or required and by supporting the use of tailored parameters for TCP connections that are spoofed.

In particular, the TCP spoofing kernel 513 discriminates among the various TCP connections based on the applications using them. That is, TCP spoofing kernel 513 discriminates among these TCP connections to determine which connection should be spoofed as well as the manner in which the connection is spoofed; e.g., whether to spoof the three-way handshake, the particular timeout parameters for the spoofed connections, etc. TCP spoofing is then performed only for those TCP connections that are associated with applications for which high throughput or reduced connection startup latency (or both) is required. As a result, the TCP spoofing kernel 513 conserves TCP spoofing resources for only those TCP connections for which high throughput or reduced connection startup latency (or both) is required. Further, the TCP spoofing kernel 513 increases the total number of TCP connections which can be active before running out of TCP spoofing resources, since any active TCP connections which do not require high throughput are not allocated resources.

One criterion for identifying TCP connections of applications for which TCP spoofing should and should not be performed is the TCP port number field contained in the TCP packets being sent. In general, unique port numbers are assigned to each type of application. Which TCP port numbers should and should not be spoofed can be stored in the TCP spoofing kernel 513. The TCP spoofing kernel 513 is also re-configurable to allow a user or operator to reconfigure the TCP port numbers which should and should not be spoofed. The TCP spoofing kernel 513 also permits a user or operator to control which TCP connections are to be spoofed based on other criteria. In general, a decision on whether to spoof a TCP connection can be based on any field within a TCP packet. The TCP spoofing kernel 513 permits a user to specify which fields to examine and which values in these fields identify TCP connections that should or should not be spoofed. Another example of a potential use for this capability is for the user or operator to select the IP address of the TCP packet in order to control for which users TCP spoofing is performed. The TCP spoofing kernel 513 also permits a user to look at multiple fields at the same time. As a result, the TCP spoofing kernel 513 permits a user or operator to use multiple criteria for selecting TCP connections to spoof. For example, by selecting both the IP address and the TCP port number fields, the system operator can enable TCP spoofing for only specific applications from specific users.

The user configurable rules can include five example criteria which can be specified by the user or operator in producing a selective TCP spoofing rule: Destination IP address; Source IP address; TCP port numbers (which can apply to both the TCP destination and source port numbers); TCP options; and IP type of service (TOS)/differentiated services (DS) field. However, as indicated above, other fields within the TCP packet can be used.

As discussed above, in addition to supporting selective TCP spoofing rules for each of these criterion, AND and OR combination operators can be used to link criteria together.

For example, using the AND combination operator, a rule can be defined to disable TCP spoofing for FTP data received from a specific host. Also, the order in which the rules are specified can be significant. It is possible for a connection to match the criteria of multiple rules. Therefore, the TCP spoofing kernel 513 can apply rules in the order specified by the operator, taking the action of the first rule that matches. A default rule can also be set which defines the action to be taken for TCP connections which do not match any of the defined rules. The set of rules selected by the operator can be defined in a selective TCP spoofing selection profile.

As an example, assuming sufficient buffer space has been allocated to spoof five TCP connections, if four low speed applications (i.e., applications which, by their nature, do not require high speed) bring up connections along with one high speed application, the high speed connection has access to only ⅕ of the available spoofing buffer space. Further, if five low speed connections are brought up before the high speed connection, the high speed connection cannot be spoofed at all. Using the TCP spoofing kernel 513 selective spoofing mechanism, the low speed connections are not allocated any spoofing buffer space. Therefore, the high speed connection always has access to all of the buffer space, improving its performance with respect to an implementation without the selective TCP spoofing feature of the TCP spoofing kernel 513.

The TCP spoofing kernel 513 also facilitates spoofing of the connection establishment three-way handshake. Three-Way Handshake Spoofing involves locally responding to a connection request to bring up a TCP connection in parallel with forwarding the connection requests across a backbone link through the VPN tunnel 113. This allows the originating IP host (for example, 301) to reach the point of being able to send the data it must send at local speeds, i.e., speeds that are independent of the latency of the backbone link. Three-way Handshake Spoofing allows the data that the IP host 301 needs to send to be sent to the destination IP host (e.g. the server 327) without waiting for the end-to-end establishment of the TCP connection. For backbone links with high latency, this significantly reduces the time it takes to bring up the TCP connection and, more importantly, the overall time it takes to get a response (from an IP host) to the data the IP host 301 sends.

A specific example in which this technique is useful relates to an Internet web page access application. With three-way handshake spoofing, an IP host's request to retrieve a web page can be on its way to a web server (e.g., the server 327) without waiting for the end-to-end establishment of the TCP connection, thereby reducing the time it takes to download the web page.

With Local Data Acknowledgement, the TCP spoofing kernel 513 locally acknowledges data segments received from the IP host 301. This allows the sending IP host 301 to send additional data immediately. More importantly, TCP uses received acknowledgements as signals for increasing the current TCP window size. As a result, local sending of the acknowledgements allows the sending IP host 301 to increase it TCP window at a much faster rate than supported by end to end TCP acknowledgements. The TCP spoofing kernel 513 (e.g., the spoofer) takes on the responsibility for reliable delivery of the data that it has acknowledged.

In the backbone protocol kernel 515, multiple TCP connections are multiplexed onto and carried by a single backbone connection. This improves system performance by allowing the data for multiple TCP connections to be acknowledged by a single backbone connection acknowledgement (ACK), significantly reducing the amount of acknowledgement traffic required to maintain high throughput across the backbone link. In addition, the backbone protocol kernel 515 selects a backbone connection protocol that is optimized to provide high throughput for the particular link. Different backbone connection protocols can be used by the backbone protocol kernel 515 with different backbone links without changing the fundamental TCP spoofing implementation. The backbone connection protocol selected by the backbone protocol kernel 515 provides appropriate support for reliable, high speed delivery of data over the backbone link, hiding the details of the impairments (for example high latency) of the link from the TCP spoofing implementation.

The multiplexing by the backbone protocol kernel 515 allows for the use of a backbone link protocol which is individually tailored for use with the particular link and provides a technique to leverage the performance of the backbone link protocol with much less dependency upon the individual performance of the TCP connections being spoofed than conventional methods. Further, the ability to tailor the backbone protocol for different backbone links makes the present invention applicable to many different systems.

The PEP peer 101 can optionally include a data compression kernel 521 for compressing TCP data, which advantageously increases the amount of data that can be carried across the backbone connection. Different compression algorithms can be supported by the data compression kernel 521 and more than one type of compression can be supported at the same time. The data compression kernel 521 can optionally apply compression on a per TCP connection basis, before the TCP data of multiple TCP connections is multiplexed onto the backbone connection or on a per backbone connection basis, after the TCP data of multiple TCP connections has been multiplexed onto the backbone connection. Which option is used is dynamically determined based on user configured rules and the specific compression algorithms being utilized. Example data compression algorithms are disclosed in U.S. Pat. Nos. 5,973,630, and 5,955, 976, the entire contents of which are hereby incorporated by reference.

C. Connection Prioritization

The prioritization kernel 517 provides prioritized access to the backbone link capacity. For example, the backbone connection can actually be divided into N (N>1) different sub-connections, each having a different priority level. In one example embodiment, four priority levels can be supported. The prioritization kernel 517 uses user-defined rules to assign different priorities, and therefore different sub-connections of the backbone connection, to different TCP connections. It should be noted that prioritization kernel 517 can also prioritize non-TCP traffic (e.g., UDP (User Datagram Protocol) traffic) before sending the traffic across the backbone link.

The prioritization kernel 517 also uses user-defined rules to control how much of the backbone link capacity is available to each priority level. According to one embodiment of the present invention, multiple PEP backbone connections can be utilized and respectively mapped to different priority levels by the prioritization kernel 517. Example criteria which can be used to determine priority include the following: Destination IP address; Source IP address; IP protocol; TCP port numbers (which can apply to both the TCP destination and source port numbers); UDP port numbers (which can apply to both the UDP destination and source port numbers); and IP type of service (TOS)/ differentiated services (DS) field. The type of data in the UDP or TCP data packets can also be used as a criterion. For example, video data could be given highest priority. Mission critical data could also be given high priority. As with selective TCP spoofing, any field in the IP packet can be used by prioritization kernel 517 to determine priority.

As mentioned above, in addition to supporting selective prioritization rules for each of these criteria, AND and OR combination operators can be used to link criteria together. For example, using the AND combination operator, a rule can be defined to assign a priority for SNMP data received from a specific host. Also, the order in which the rules are specified can be significant. It is possible for a connection to match the criteria of multiple rules. Therefore, the prioritization kernel 517 can apply rules in the order specified by the operator, taking the action of the first rule that matches. A default rule can also be set which defines the action to be taken for IP packets which do not match any of the defined rules. The set of rules selected by the operator can be defined in a prioritization profile.

For prioritization to operate effectively with the VPN function, information regarding prioritization of a packet needs to be visible to the terminal 305 (FIG. 3), as the terminal 305 is responsible for scheduling that packet's transmission across the access network 307. In one embodiment of the present invention, the PEP peer 101 provides an indication of the priority of a backbone connection to the VPN peer 103 so that the VPN peer 103 can encode this priority information in the unencrypted header of the backbone's tunneled packets. This approach allows the terminal 305 to determine the priority of the packets and to honor this prioritization when forwarding the packets across the access network 307. In an example embodiment, the prioritization is encoded in the Type Of Service (TOS) bits of the backbone packet's IP header field. IETF RFCs 1340 and 1349, which are incorporated herein in their entireties, provide details regarding how prioritization can be encoded in this field. The VPN peer 103 copies a packet's TOS field into the tunneled packet's outer, unencrypted IP header's TOS field, thereby making the prioritization available to the terminal 305 in a standards-compliant fashion.

Alternatively, the DS field can be used to capture prioritization information. Differentiated Services functions are more fully described in IETF RFCs 2475 and 2474, which are incorporated herein in their entireties.

In regards to the path selection functionality, the path selection kernel 519 is responsible for determining which path an IP packet should take to reach its destination. The path selected by the path selection kernel 519 can be determined by applying path selection rules. The path selection kernel 519 also determines which IP packets should be forwarded using an alternate path and which IP packets should be dropped when one or more primary paths fail. Path selection parameters can also be configured using profiles. The path selection rules can be designed to provide flexibility with respect to assigning paths while making sure that all of the packets related to the same traffic flow (e.g., the same TCP connection) take the same path (although it is also possible to send segments of the same TCP connection via different paths, this segment "splitting" can have negative side effects). Example criteria that can be used to select a path include the following: priority of the IP packet as set by the prioritization kernel 517 (should be the most common criterion); Destination IP address; Source IP address; IP protocol; TCP port numbers (which can apply to both the TCP destination and source port numbers); UDP port numbers (which can apply to both the UDP destination and source port numbers); and IP type of service (TOS)/differentiated services (DS) field. Similar to selective TCP spoofing and prioritization, the path selection kernel 517 can determine a path by using any field in the IP packet.

As with the prioritization criteria (rules) the AND and OR combination operators can be used to link criteria together. For example, using the AND combination operator, a rule can be defined to select a path for SNMP data received from a specific host. Also, the order in which the rules are specified can be significant. It is possible for a connection to match the criteria of multiple rules. Therefore, the path selection kernel 519 can apply rules in the order specified by the operator, taking the action of the first rule that matches. A default rule can also be set which defines the action to be taken for IP packets which do not match any of the defined rules. The set of rules selected by the operator can be defined in a path selection profile.

By way of example, a path selection rule can select the path based on any of the following path information in which IP packets match the rule: a primary path, a secondary path, and a tertiary path. The primary path is be specified in any path selection rule. The secondary path is used only when the primary path has failed. If no secondary path is specified, any IP packets that match the rule can be discarded when the primary path fails. The tertiary path is specified only if a secondary path is specified. The tertiary path is selected if both the primary and secondary paths have failed. If no tertiary path is specified, any IP packets that match the rule can be discarded when both the primary and secondary paths fail. Path selection can be generalized such that the path selection rule can select up to N paths where the Nth path is used only if the (N−1)th path fails. The example above where N=3 is merely illustrative, although N is typically a fairly small number.

By way of example, the operation of the system of FIG. 1 is described as follows. First, a backbone connection is established between the PEPs 101, 107 of two network sites (i.e., the two spoofers), located at each end of the backbone link for which TCP spoofing is desired. Whenever an IP host 301 initiates a TCP connection, the TCP spoofing kernel 513 of the PEP peer 101 local to the respective IP host checks its configured selective TCP spoofing rules. If the rules indicate that the connection should not be spoofed, the PEP peer 101 allows the TCP connection to flow end-to-end unspoofed. If the rules indicate that the connection should be spoofed, the spoofing PEP peer 101 locally responds to the IP host's TCP three-way handshake. In parallel, the spoofing PEP peer 101 sends a message across the backbone link to its peer 107 asking it to initiate a TCP three-way handshake with the other IP host on its side of the backbone link. Data is then exchanged between the IP hosts with the PEP peer 101 locally acknowledging the received data and forwarding it across the backbone link via the high speed backbone connection, compressing the data as appropriate based on the configured compression rules. The priority of the TCP connection is determined when the connection is established. The backbone protocol kernel 515 can multiplex the connection with other received connections over a single backbone connection, the prioritization kernel 517 determines the priority of the connection and the path selection kernel 519 determines the path the connection is to take.

The PEP peer 101, as described above, advantageously, improves network performance by allocating TCP spoofing-related resources, such as buffer space, control blocks, etc., only to TCP connections for which spoofing is beneficial; by spoofing the three-way handshake to decrease data response time; by reducing the number of ACKs which are transmitted by performing local acknowledgement and by acknowledging multiple TCP connections with a single ACK; by performing data compression to increase the amount of data that can be transmitted; by assigning priorities to different connections; and by defining multiple paths for connections to be made. Further details of the operation of the PEP peer 101 is described in co-pending U.S. patent application field on Jul. 12, 2001 (Ser. No. 09/903,832), entitled "Method and System for Improving Network Performance Using a Performance Enhancing Proxy Architecture."

As mentioned previously, in addition to PEP functionalities, other network acceleration techniques can also be integrated with VPN. For example, a different proxy architecture supports HyperText Transfer Protocol (HTTP) prefetching, Domain Name Service (DNS) caching, and Layer 4 (L4) switching to improve user response time. To appreciate these network acceleration techniques, it is instructive to describe the operation of web content retrieval.

Web pages are formatted according to the Hypertext Markup Language (HTML) standard which provides for the display of high-quality text (including control over the location, size, color and font for the text), the display of graphics within the page and the "linking" from one page to another, possibly stored on a different web server. The host 301, for example, is loaded with a web browser (e.g., Microsoft Internet Explorer, Netscape Navigator) to access the web pages that are resident on a web server 313; collectively the web pages and the web server 313 denote a "web site." A terminal 305 may be provided to increase system performance by supporting such functions as HyperText Transfer Protocol (HTTP) proxying and Domain Name Service (DNS) proxying. HTTP is an application level protocol that is employed for information transfer over the Internet 311. RFC (Request for Comment) 2618 specifies this protocol and is incorporated herein in its entirety. As with PEP, these proxies are executed in the clear.

The user enters or specifies a URL to the web browser of the host 301, which in turn requests a URL from the web server 313. The host 301 may need to retrieve an Internet Protocol (IP) address corresponding to a domain name of the URL from a domain name service (DNS) server 117. Such a domain name lookup conventionally requires a traversal of the access network 307 which introduces additional delay. The web server 313 returns an HTML page, which contains numerous embedded objects (i.e., web content), to the web browser.

Upon receiving the HTML page, the web browser parses the page to retrieve each embedded object. The retrieval process requires the establishment of separate communication sessions (e.g., TCP (Transmission Control Protocol) connections) to the web server. That is, after an embedded object is received, the TCP connection is torn down and another TCP session is established for the next object. Given the richness of the content of web pages, it is not uncommon for a web page to possess over 30 embedded objects; thereby consuming a substantial amount of network resources, but more significantly, introduces delay to the user. The establishment of the TCP connection takes one access network 307 round trip traversal and then the requesting of the URL and receiving its response takes another round trip traversal. Delay is of a particular concern in the system 100 if the access network 307, in an example embodiment, is a satellite network, in that the network latency of the satellite network is conventionally longer than terrestrial networks. To minimize such delay, the system 100 supports HTTP proxying and/or DNS proxying.

The web browser of the host 301 may be configured to either access URLs directly from the web server 313 or from the terminal 305, which acts as a HTTP proxy. As discussed above, a URL specifies an address of an "object" in the Internet 311 by explicitly indicating the method of accessing the resource.

The terminal 305 acts as an intermediary between one or more browsers and many web servers (e.g., server 313). The web browser requests a URL from the terminal 305 which in turn "gets" the URL from the addressed web server 313. When the browser is configured to access URLs via a terminal 305, the browser does not need to perform a DNS lookup of the URL's web server because it is requesting the URL from the proxy server and need only be able to contact the proxy server. The terminal 305 can cache the most frequently accessed URLs. When the web server 313 delivers a URL to the terminal 305, the web server 313 may deliver along with the URL an indication of whether the URL should not be cached and an indication of when the URL was last modified.

Under this non-PEP network acceleration scheme, the terminal 305 supports two proxy agents: a HTTP Proxy and a DNS proxy, and can include a Layer 4 (L4) switch. As used herein, Layer 4 refers to the transport layer of the OSI (Open Systems Interconnection) model; it is recognized, however, that Layer 4 may denote any equivalent protocol. The DNS Proxy receives and processes DNS requests. The DNS Proxy handles identically such requests whether they come directly from a client or transparently via the L4 switch. When the DNS Proxy receives a request, the DNS Proxy looks up the domain name in its cache. If the DNS proxy is unable to service the request from this DNS cache, the DNS Proxy sends out a DNS request to the configured DNS server (not shown) and provides the response to the requestor (e.g., host 301). The DNS proxy then updates the entry in the cache.

Further, the terminal 305 utilizes, in an example embodiment, a TCP/IP stack as well as a network address translation (NAT) function layer. The NAT layer provides address translation between a private network (i.e., a stub domain), such as a local area network (LAN) 303, and a public network, such as the Internet 311. Address translation is necessary when the LAN 303 utilizes unregistered IP addresses, for example. The NAT functions are detailed in Internet Engineering Task Force (IETF) Request for Comment (RFC) 1631, entitled "The IP Network Address Translator (NAT)," which is incorporated herein by reference in its entirety.

The Layer 4 switch function, which can be included in a LAN driver (e.g., Ethernet driver), routes all domain name server lookups (i.e., DNS requests) and HTTP requests traversing the driver up through the stack to their respective proxies. The Layer 4 switch function identifies these requests by examining the port number of the packets, and modifies the addresses and ports to redirect the request packets to the appropriate proxy. It performs a similar function of modifying packet address and port fields of response packets from the proxies to route those responses back to the browser. To accomplish this, the Layer 4 switch function also maintains the TCP connection control block. This operation by the Layer 4 switch function is more fully described in U.S. Provisional patent application, entitled "Transparent Proxying Enhancement" (Ser. No. 60/271, 405), which is incorporated herein by reference in its entirety.

Figure 6:
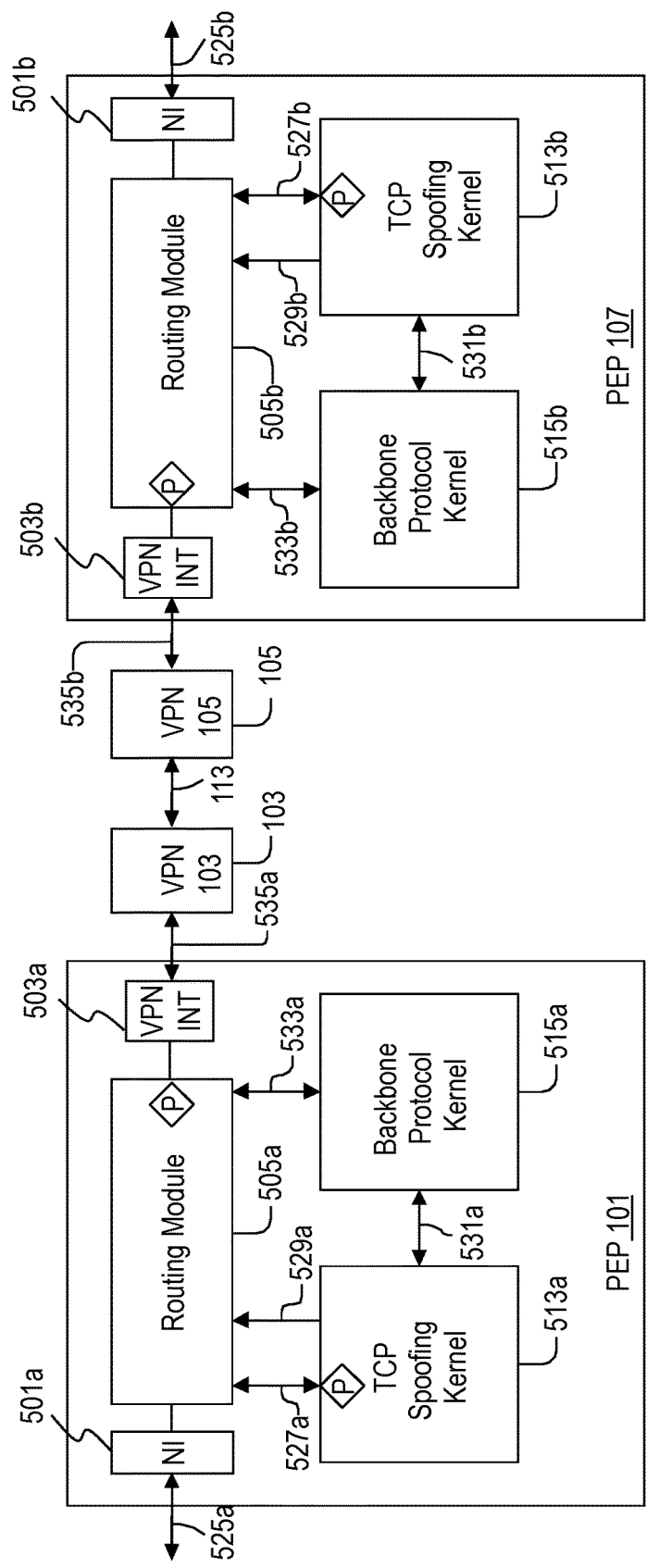
FIG. 6 is a diagram of example PEP and VPN functionality integration in the system of FIG. 1, according to one embodiment of the present invention.

FIG. 6 is a diagram of the PEP and VPN functionality integration of FIG. 1, according to one embodiment of the present invention. The PEP peer 101 that has connectivity to the PEP peer 107 via a backbone connection 535a and 535b over encrypted tunnel 113 provided by VPN peers 103 and 105. By way of example, PEP peers 101 and 107 handle IP packets. PEP peer 101 includes an internal IP packet routing module 505a that receives local IP packets 525a and exchanges these packets with a TCP spoofing kernel 513a and a backbone protocol kernel 515a. Similarly, the remote PEP peer 107 includes an internal IP packet routing module 505b that is in communication with a TCP spoofing kernel 513b and a backbone protocol kernel 515b.

For traffic from the host 301 destined for the access network 307 (i.e., egress traffic), the PEP peer 101 receives IP packets 525a from its network interface 501. Non-TCP IP packets can be forwarded (as appropriate) to the interface 503. TCP segments 527a are internally forwarded to TCP spoofing kernel 513a. TCP segments 529a which belong to connections that are not to be spoofed are passed back by the spoofing kernel 513a to the routing module 505a to be forwarded unmodified to the interface 503. For spoofed TCP connections, the TCP spoofing kernel 513a locally terminates the TCP connection. TCP data 531a that is received from a spoofed connection is passed from the spoofing kernel 513a to the backbone protocol kernel 515a, and then multiplexed data 533a is provided onto the appropriate backbone protocol connection. The backbone protocol kernel 515a ensures that the data 533a is delivered across the access network 307 as IP packets 535a via the VPN peer 103.

For traffic from the access network 307 (ingress traffic), the PEP peer 107 receives IP packets from its interface 503. IP packets that are not addressed to the end point 107 are simply forwarded (as appropriate) to the network interface 501. IP packets 535b addressed to the end point 107, which have a protocol header type of "PBP" (PEP Backbone Protocol) are forwarded as data 533b to the backbone protocol kernel 515b. The backbone protocol kernel 515b extracts the TCP data and forwards the extracted data 531b to the TCP spoofing kernel 513b for transmission as data 527b on the appropriate spoofed TCP connection. In addition to carrying TCP data, the backbone protocol connection is used by the TCP spoofing kernel 513a to send control information to its peer TCP spoofing kernel 513b in the remote PEP peer 107 to coordinate connection establishment and connection termination.

Prioritization "P" can be applied at four points in the system of FIG. 6 within routing module 505a and TCP spoofing kernel 513a of PEP peer 101, and within routing module 505b, and TCP spoofing kernel 513b of PEP peer 107. With egress traffic, priority rules are applied to the packets of individual TCP connections at the entry point to the TCP spoofing kernel 513a. These rules allow a user (e.g., customer) to control which spoofed applications have higher and lower priority access to spoofing resources. Egress prioritization is also applied before forwarding packets to the access network 307. This allows a customer to control the relative priority of spoofed TCP connections with respect to unspoofed TCP connections and non-TCP traffic (as well as to control the relative priority of these other types of traffic with respect to each other). On the ingress side, prioritization is used to control access to buffer space and other resources in the PEP peer 107, generally and with respect to TCP spoofing. The PEP peers 101 and 107 and the corresponding VPN functions 103 and 105 can be implemented at various components within the system of FIG. 3, according to various embodiments.

The architecture of FIGS. 5 and 6 provides a number of advantages. First, TCP spoofing can be accomplished for both ingress and egress traffic. Additionally, the system supports spoofing of TCP connection startup, and selective TCP spoofing with only connections that can benefit from spoofing actually spoofed. Further, the system enables prioritization among spoofed TCP connections for access to TCP spoofing resources (e.g., available bandwidth and buffer space). This prioritization is utilized for all types of traffic that compete for system resources.

With respect to the backbone connection, the system is suitable for application to a satellite network as the WAN (shown in FIG. 4). That is, the backbone protocol is optimized for satellite use in that control block resource requirements are minimized, and efficient error recovery for dropped packets are provided. The system also provides a feedback mechanism to support maximum buffer space resource efficiency. Further, the system provides reduced acknowledgement traffic by using a single backbone protocol ACK to acknowledge the data of multiple TCP connections.

As previously described with respect to FIG. 1, a pair of PEP peers 101, 107 can be located at the edge of a network that requires enhancement in performance and/or efficiency. These PEP peers 101, 107 can be located in devices or network elements in such a way that they can intercept a TCP connection's packets, as illustrated below in FIG. 7.

Figure 7:
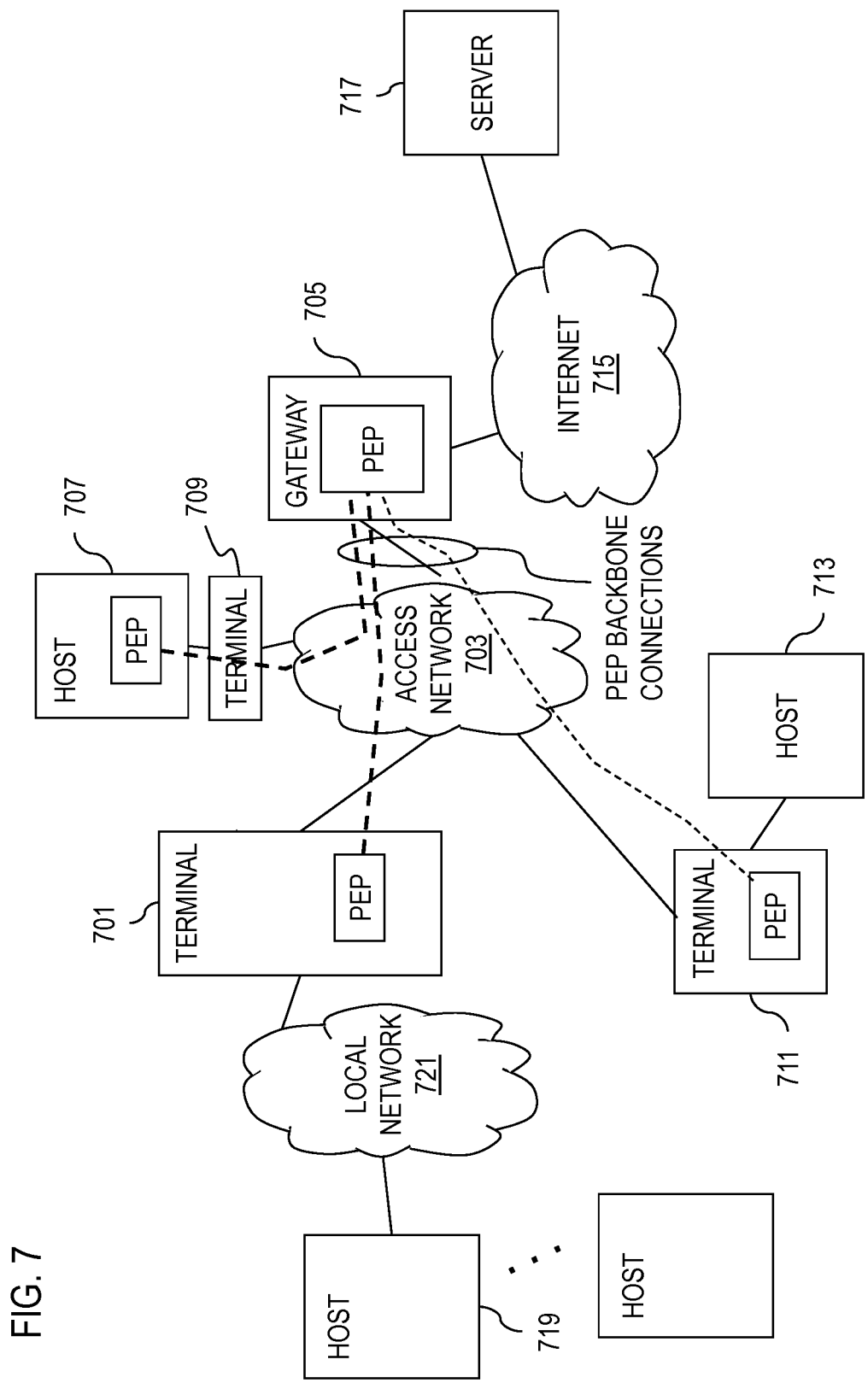
FIG. 7 is a diagram of a system capable of deploying PEP functions, according to one embodiment of the present invention.

FIG. 7 is a diagram of a system capable of deploying PEP functions, according to one embodiment of the present invention. PEP functionality, as shown, can be deployed in a number of network elements. In this scenario, a terminal 701 supports PEP functions in communicating over an access network 703 to a PEP peer within a gateway 705. The PEP function of the gateway 705 can also interact with a PEP function within a host 707 that interfaces with a terminal 709 for access to the network 703. Additionally, the PEP function can reside in a terminal 711, which serves the host 713. In this manner, the PEP peers within the network elements 701, 707, 711 can establish PEP connections (i.e., PEP backbone connections) to the gateway 705, which permits access to the Internet 715. For example, the host 713 can retrieve information from server 717 (e.g., web server) over the PEP connection between the PEP peers within the terminal 711 and the gateway 705 with minimal delay over the access network 703.

Likewise, hosts 719, which are connected via a local network 721, can access the web server 717 off the Internet 715 without great impact from the latency of the access network 703 over the PEP connection established by the terminal 701 to the gateway 705. The PEP peer within the terminal is transparent to the local network 721, and thus, the hosts 719.

IV. Example VPN and PEP Configurations

Figure 8:
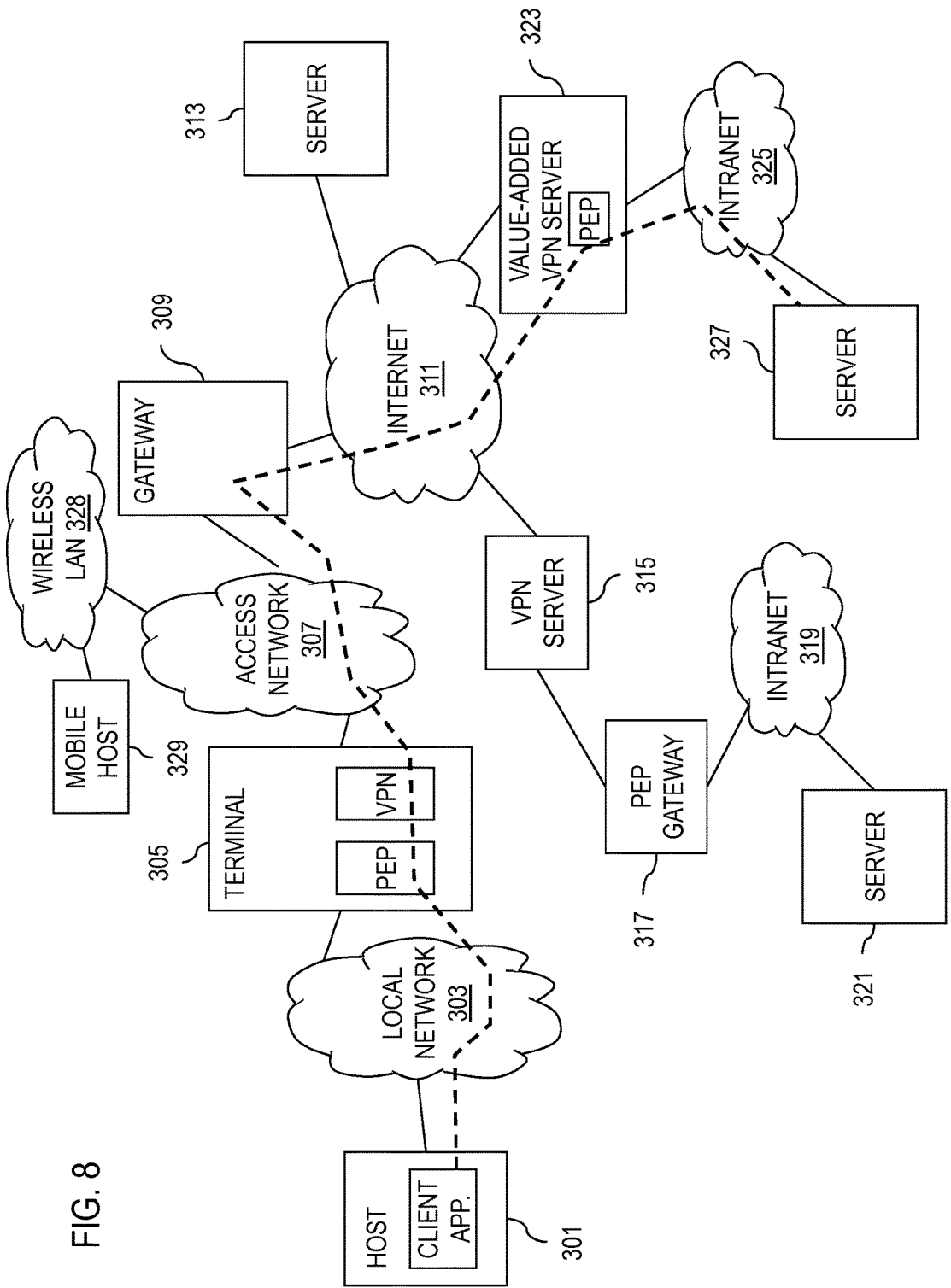
FIG. 8 is a diagram of the system of FIG. 3 in which the access terminal has integrated VPN and PEP functionalities and communicates with the Value-added VPN server, according to an embodiment of the present invention.

FIG. 8 is a diagram of the system of FIG. 3 in which the access terminal has integrated VPN and PEP functionalities and communicates with the Value-added VPN server, according to an embodiment of the present invention. To implement PEP, the PEP function requires access to the packets to be "PEPed", that is, the packets that will be transported over the PEP connection, for example, to traverse the access network 307. Also, to properly provide VPN capability, the VPN peers need access to the packets that are to be tunneled and encrypted. Accordingly, in one embodiment, the terminal 305 includes the PEP and VPN functions, which have the required access to all the packets. The access terminal 305 includes integrated PEP and VPN peer components and connects to the access network 307 to the access gateway 309 to a communications network 311, such as the Internet.

According to one embodiment of the present invention, the system of FIG. 8 can include an intelligent access client (e.g., as deployed in the terminal 305) and an intelligent access gateway 309 to support the integrated VPN and PEP services in the access network 307, which can be a satellite system (e.g., INMARSAT®). For example, the intelligent access client can be configured to perform TCP, PEP, and ITU (International Telecommunications Union) V.44 compression. The intelligent access client can be hosted by any number of computing devices, such as desktop PC, laptop, Personal Digital Assistant (PDA), cellular phone, IEEE 802.11 client, web appliance, etc.

Figure 12:
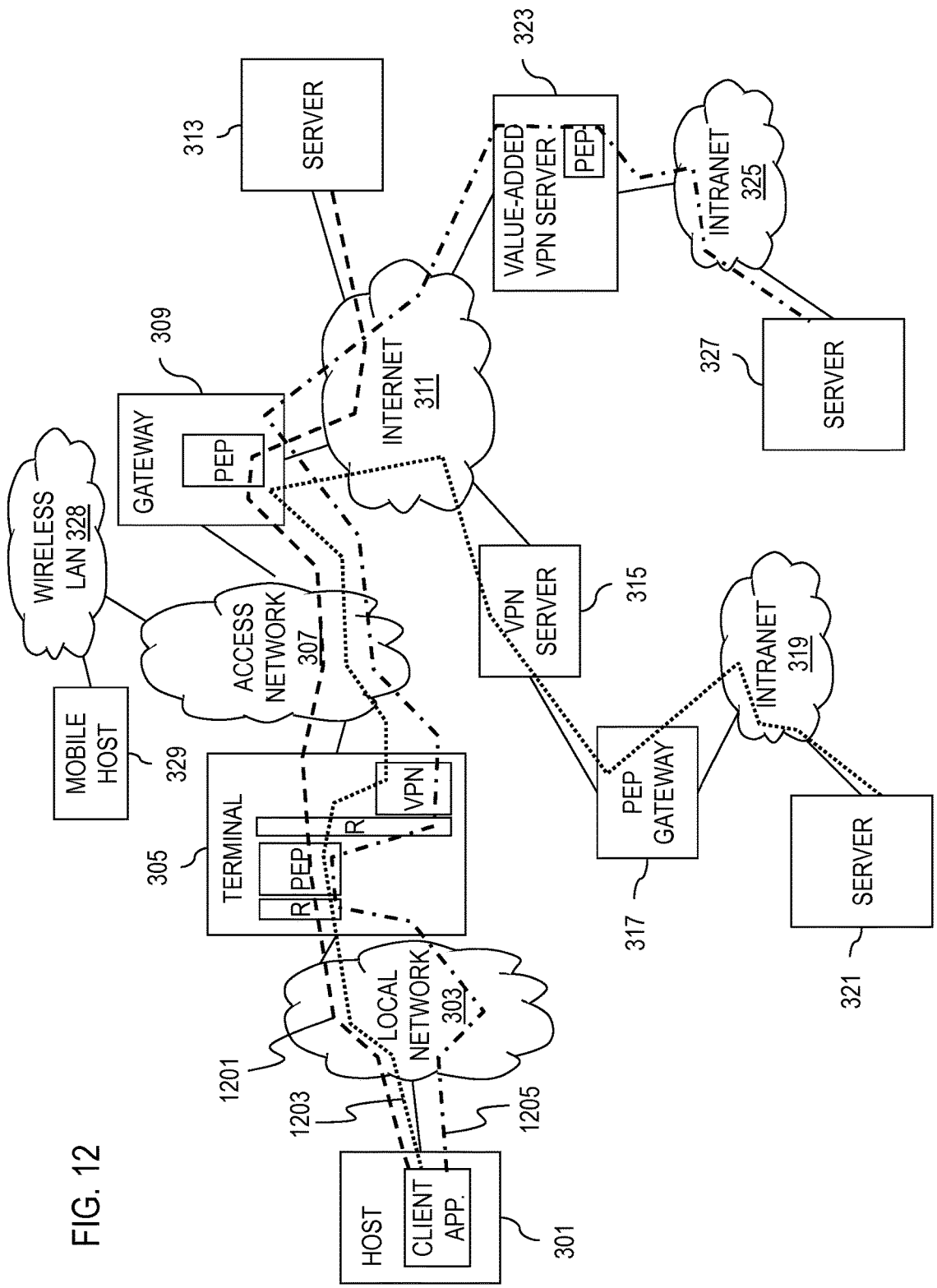
FIG. 12 is a diagram of the system of FIG. 3 in which the access terminal has integrated VPN and PEP functionalities and is capable of dynamically selecting PEP backbone connections, according to an embodiment of the present invention.

Similarly, the intelligent access gateway 309 can be configured to support TCP, PEP, and ITU V.44 compression (as shown in FIG. 12). The gateway 309 can also provide load sharing and 1:N redundancy for high availability. Further, the gateway 309 can interface with a Gateway GPRS (General Packet Radio Service) Serving/Support Node (GGSN) via the Gi interface.

The terminal 305, for example, a VSAT terminal, can be equipped with PEP and VPN peers to provide network performance enhancements and security. The terminal 305 is attached to a local network 303 that serves a host 301, which executes a client application (e.g., web browser). One or more PEP backbone connections between the PEP peer of the terminal 305 and the PEP peer of the Value-added VPN server 323 allow TCP connections and their VPN data to be carried efficiently and with good performance across the access network 307 and the Internet 311.

When a TCP connection is routed through the terminal, the terminal 305 passes its packets through the PEP peer where its data is carried by a PEP backbone connection. The packets carried over the PEP backbone connection are then passed through the VPN peer which tunnels and encrypts the packets. Optionally, the VPN peer can provide packet authentication to protect against tampering by applying headers to the IP packet.

The VPN peer within the terminal 305 decrypts (and optionally authenticates) tunneled packets coming across the access network 307 and transmits these packets, which are now in the "clear," to the PEP peer, which then implements the backbone protocol and converts the packets back into TCP. The terminal 305 then passes the reconstituted TCP frames to the host 301 on the local network 303.

Under this example, the Value-added VPN server 323 includes the ability to perform PEP and VPN functions, such that traffic from the host 301 can securely access the server 327 off the intranet 325. To implement the value added service, the PEP function within the server 323 maintains routing information that maps TCP connections to PEP peers and then to map PEP backbone connections to the appropriate VPN tunnel. As described in FIG. 3, the PEP peer to VPN tunnel routing can be performed based on a routing table, which can be dynamically created or loaded into the Value-added VPN server 323. Alternatively, routing can be integrated where there is either one or no peers for each VPN tunnel, and the selection of the VPN tunnel implicitly selects the PEP peer. Under this approach, the integrated routing can either be configured completely or dynamically learned via PEP peer discovery (e.g., by the PEP backbone connection establishment) or by a routing protocol.

In another example of how the PEP and VPN functions can be implemented, a PEP connection and associated VPN tunnel can be established between the host 301 and the server 321 within the intranet 319, as described below.

Figure 9:
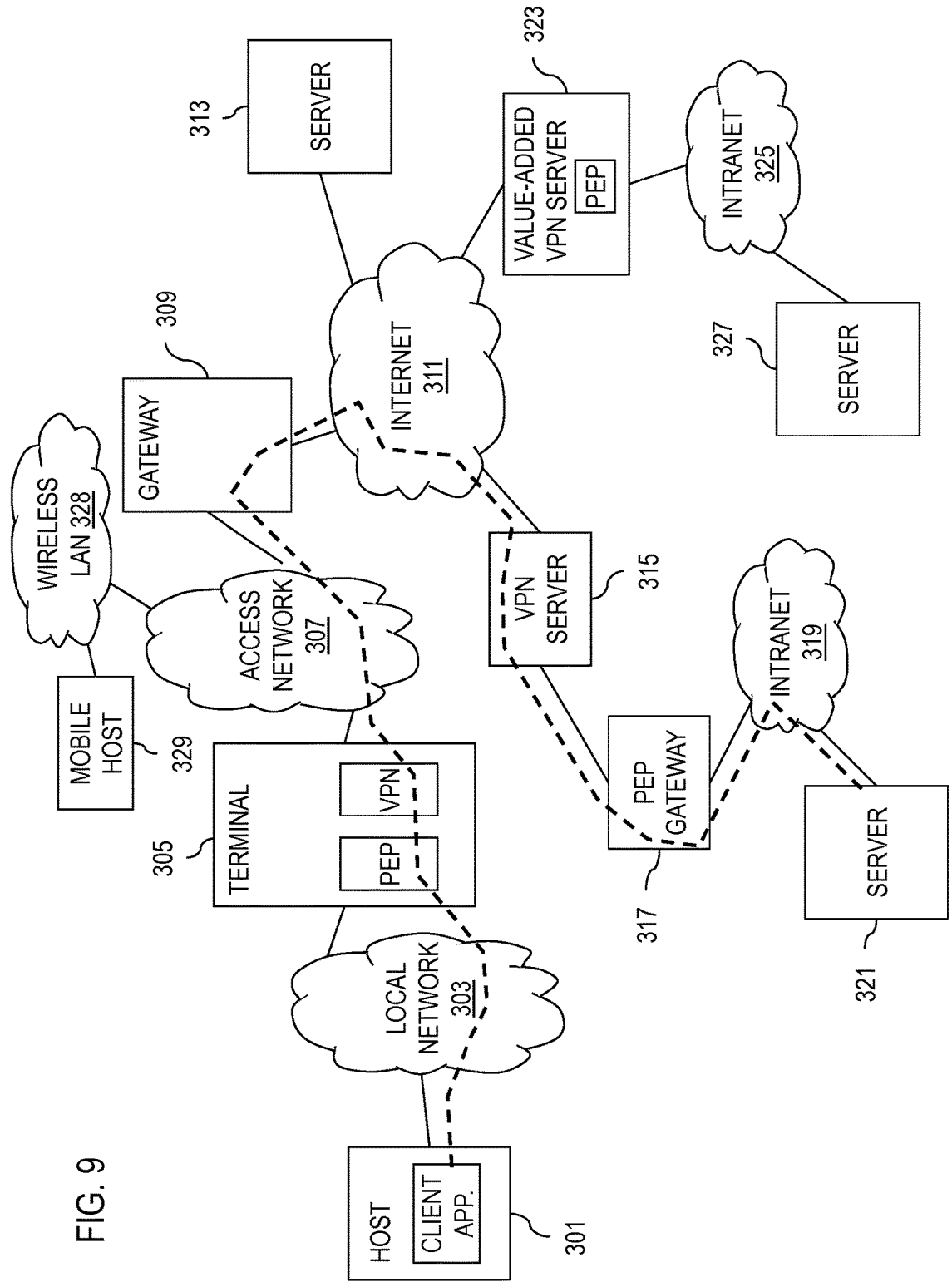
FIG. 9 is a diagram of the system of FIG. 3 in which the access terminal has integrated VPN and PEP functionalities and communicates with the VPN server and the PEP gateway, according to an embodiment of the present invention.

FIG. 9 is a diagram of the system of FIG. 3 in which the access terminal has integrated VPN and PEP functionalities and communicates with the VPN server and the PEP gateway, according to an embodiment of the present invention. Under this scenario, secure communications is supported by the VPN peer within the terminal 305 and the VPN server 315. A VPN tunnel is established between the terminal 305 and the VPN server 315. The client application within the host 301 generates traffic over the local network 303 to the terminal 305, which compresses and encrypts the traffic based on the PEP and VPN functions. This encrypted traffic is transported across the access network 307 to the Internet 311 via the gateway 309. At this point, the VPN server 315 decrypts the traffic from the host 301 and forwards the packets to the PEP gateway 317, which communicates with the intranet 319 on which the destination server 321 resides.

As stated, a variety of host-to-host connectivity configurations can be supported.

Figure 10:
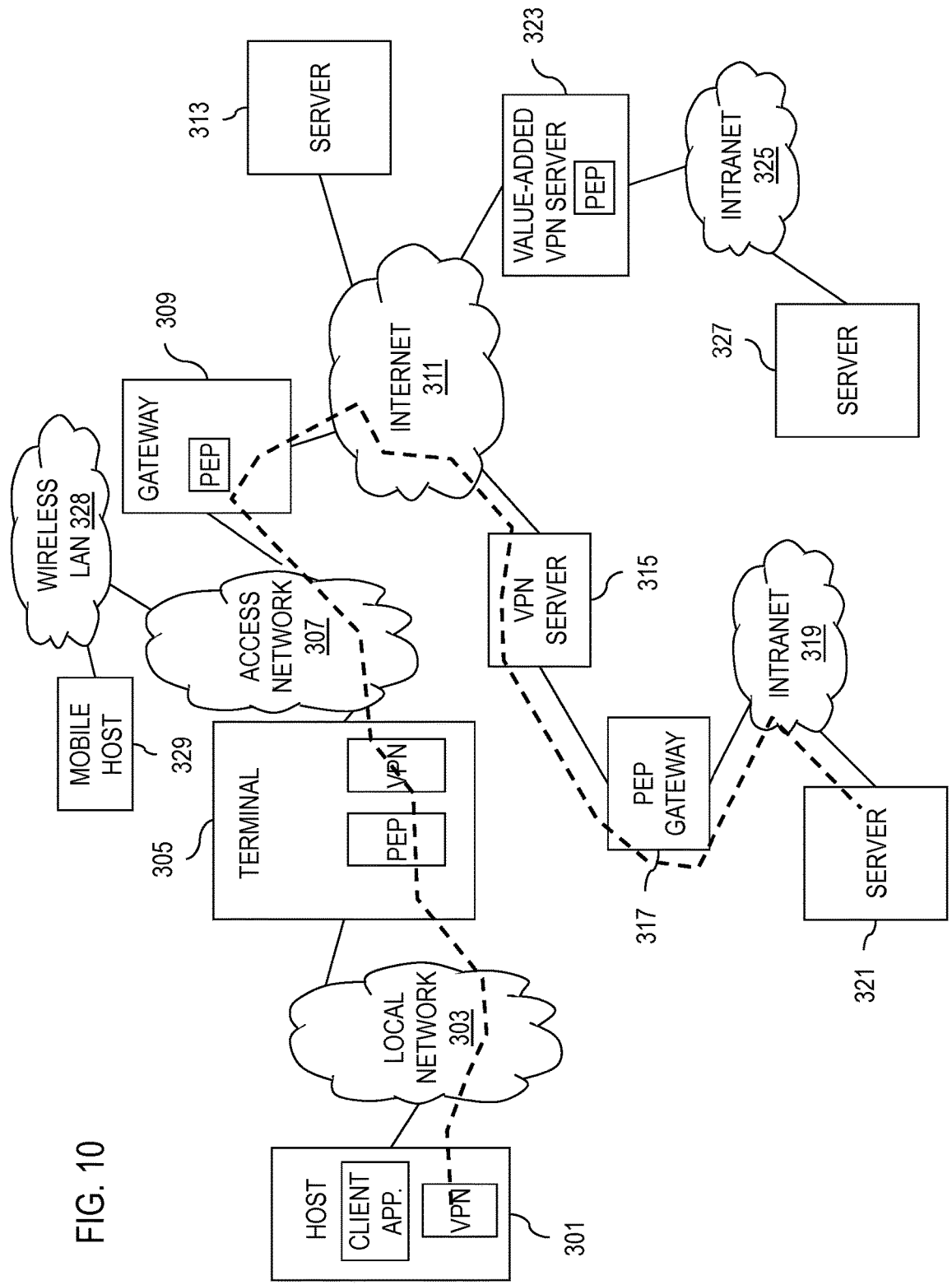
FIG. 10 is a diagram of a communication system in which a VPN client resides in a host served by a terminal having an integrated PEP and VPN function for communication over an access network, according to various embodiment of the present invention.
Figure 11:
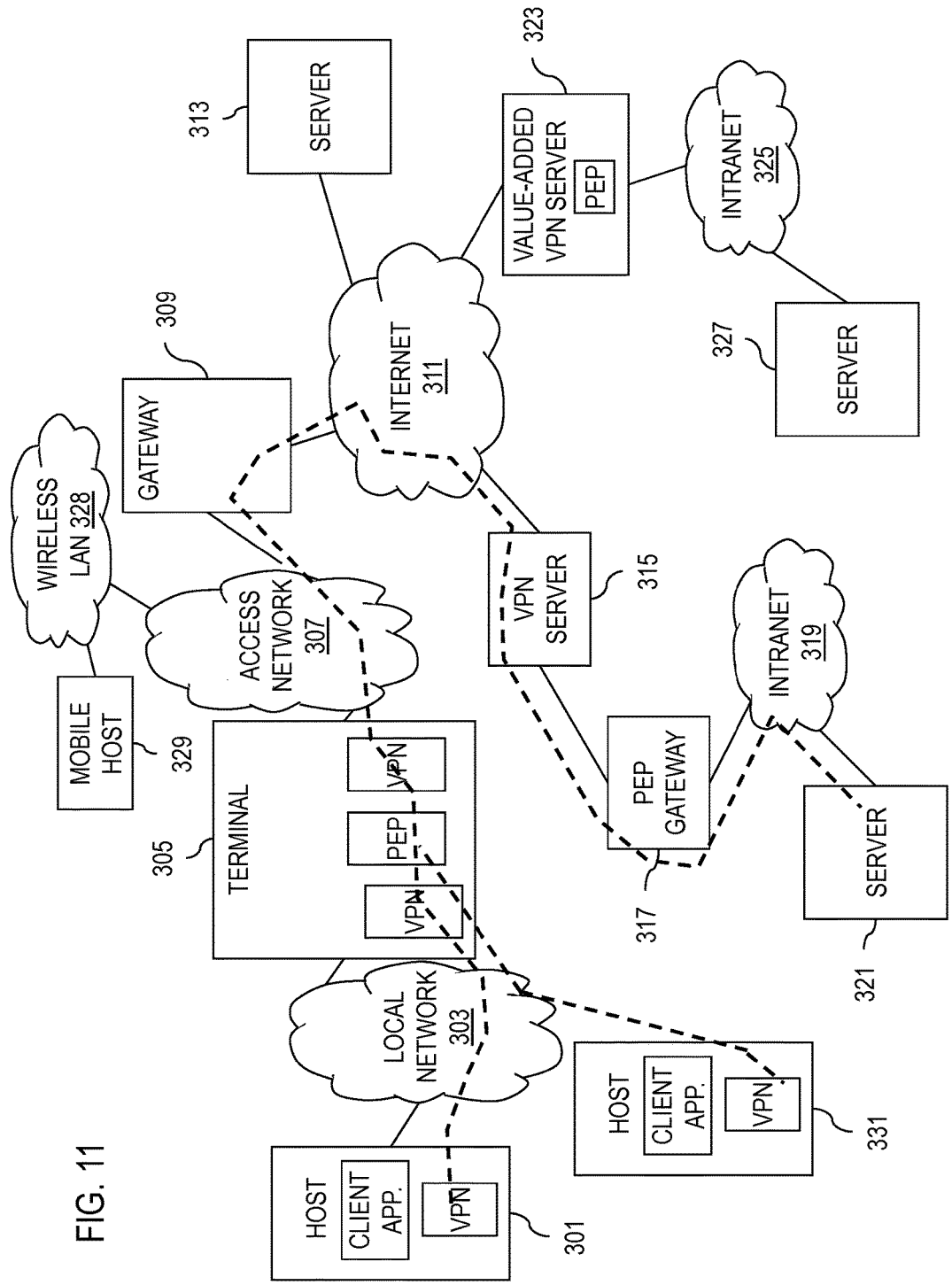
FIG. 11 is a diagram of a communication system in which VPN clients reside in multiple hosts served by a terminal having an integrated PEP and VPN function for communication over an access network, according to various embodiment of the present invention.

FIGS. 10 and 11 show diagrams of communication systems in which one or more VPN clients communicate with a terminal having VPN and PEP functions, according to various embodiments of the present invention. In some cases, it may be desirable to not implement the PEP function in the user's host; accordingly only the VPN function without the PEP function is loaded in the host, as shown in FIGS. 10 and 11. For instance, if the host 301 lacks sufficient memory or processing power to support both PEP and VPN functionality, then installing only the VPN peer in the host 301, while the PEP function resides in the terminal 305 will not likely impact the security and performance advantages of the system. Assuming the access network 307 poses the potential bottleneck in the system, situating the PEP peers to encompass this network 307 will provide the greatest performance gain. As discussed previously, the users' do not want to expose their traffic on the local network 303 (for example, because it is a publicly accessible wireless LAN or because the "wire" might be tapped). Consequently, a segmented VPN connection can be utilized, such that the PEP function is applied in between the segments. In other words, under this arrangement, the VPN connection is considered "segmented" across a PEP connection and a non-PEP connection (i.e., standard TCP connection). For example, the VPN client in the host 301 establishes a VPN tunnel with the VPN peer in the terminal 305, while the PEP peer in the terminal 305 operates in conjunction with the PEP peer in the gateway 309 over the access network 307. The access network 307, as discussed earlier, can be a VSAT satellite network, which is inherently secure. The VPN peer of the gateway 309 communicates with the VPN server 315 over a secure tunnel that is independent from the VPN segment between the host 301 and the terminal 305. The above segmented approach can be applied to multiple hosts 301, 331 (as shown in FIG. 11) in which multiple VPN connections can share one or more PEP connection across the access network 307 to communicate with the same intranet 319. Separate VPN connections are established between the access terminal 305 and each host 301, 331. Also, a PEP connection and VPN connection are established between the access terminal 305 and the VPN server 315 and the PEP gateway 317 on the other side of the access network 307. Traffic received from the hosts 301, 331 by the terminal 305 via the VPN connections to the hosts 301, 331 is passed through the PEP function of the terminal 305 and then fed into the VPN connection to the VPN peer of the VPN server 315 on the other side of the access network 307. Subsequently, the decrypted traffic out of the VPN server 315 is transmitted to the PEP function of the PEP gateway 317.

On the VPN server side of the access network 307, the segmentation can also be used, for example, to allow the access network 307 provided to host the PEP function for cost and scalability reasons. This aspect of an embodiment of the present invention provides great flexibility for supporting configurations in which the integrated PEP and VPN cannot be, or is desirable to not be, "pushed out" to the very edge of the network paths (which are protected by VPN functionality).

The above concept can be extended to support any number of segments, allowing different or differently tuned and configured PEP functions to be used for different parts of the secured path.

FIG. 12 is a diagram of the system of FIG. 3 in which the access terminal has integrated VPN and PEP functionalities and is capable of dynamically selecting PEP backbone connections, according to an embodiment of the present invention. As noted, the mapping of TCP connections to a PEP peer can be performed by a routing table (shown as "R"). In this example, the terminal 305 maintains the routing table, which identifies the PEP peer's IP address and contains one or more IP address masks in such a way that a destination IP address of a TCP connection matches one or more of the IP address masks. Accordingly, the TCP connection can be routed to the appropriate PEP peer. The routing information in this table may be either statically configured or dynamically created as PEP peers are "discovered," and VPN tunnels and PEP backbone connections are created to the peers.

The routing within the terminal 305 is integrated such that there is one VPN peer (e.g., VPN server 315 and Value-added VPN server 323) for each VPN tunnel and the selection of the VPN tunnel implicitly selects the PEP peer (i.e., gateway 309, PEP gateway 317, and PEP peer in the Value-added VPN server 323). The integrated routing can either be configured completely or dynamically learned via PEP peer discovery (typically by the PEP backbone connection establishment) or by a routing protocol. In this example, the client application in the host 301 can generate traffic that take a number of paths 1201, 1203, 1205, according to the needs of the application. In one scenario, the host 301 seeks to communicate with the server 313 (e.g., web server) within the Internet; in this case, the terminal 305 elects to route the traffic over the path 1201 using only the PEP function, without the VPN function, based on the routing table. However, when the host being accessed is local to an intranet and only reachable via VPN, the terminal 305 can invoke its VPN peer in support of communication with the servers 321, 327 within the respective intranets 319, 325 over the paths 1203 and 1205. The capability to select the particular PEP backbone connection allows the terminal 305 to both allow its hosts (e.g., 301) to reach hosts (e.g., server 313) on the Internet 311 and to securely reach hosts (e.g., servers 321, 327) within various intranets 319, 325.

Figure 13:
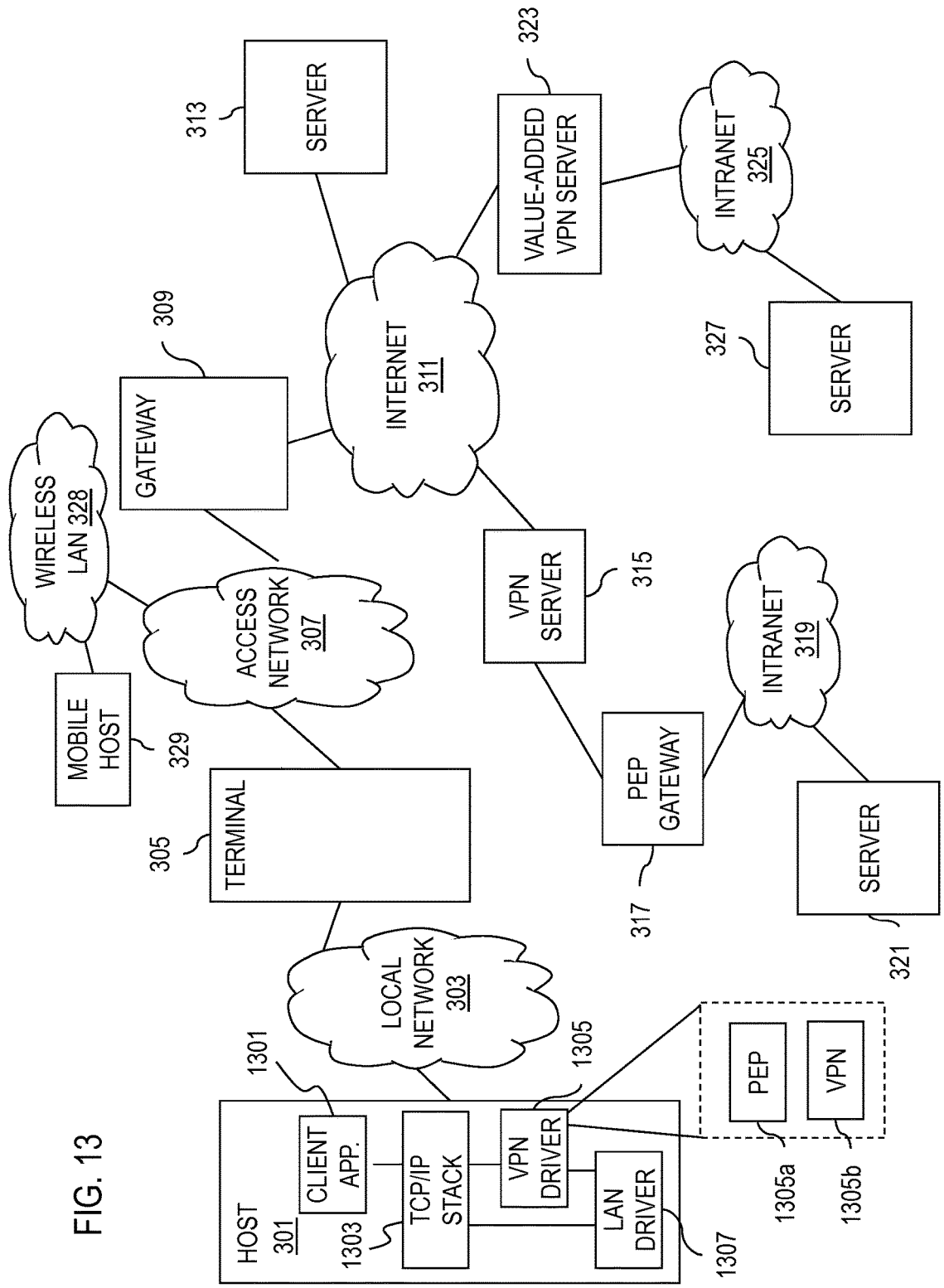
FIG. 13 is a diagram of the system of FIG. 3 in which a host has integrated VPN and PEP functionalities, according to an embodiment of the present invention.

FIG. 13 is a diagram of the system of FIG. 3 in which a host has integrated VPN and PEP functionalities, according to an embodiment of the present invention. For example, the host 301 includes a client application 1301 above a TCP/IP stack 1303; further, a VPN driver 1305, which provides a PEP peer 1305a and a VPN peer 1305b. Also, the host 301 utilizes LAN driver 1307 to interface with the local network 303.

The VPN driver 1305 executes the necessary protocols to create the VPN tunnels. These protocols include the following: Carrier protocol, Encapsulating protocol, and Passenger protocol. The carrier protocol is specific to the network that is transporting the packets. The Encapsulating protocol can include, for example, Generic Routing Encapsulation (GRE), IPSec, PPTP, and L2TP. Lastly, the Passenger protocol is the protocol of the data that is being transported, such as IP.

The above configuration supports both the PEP function and the VPN function within the VPN driver. However, in another embodiment of the present invention, the PEP function can be implemented as a separate driver, as shown in FIG. 14.

Figure 14:
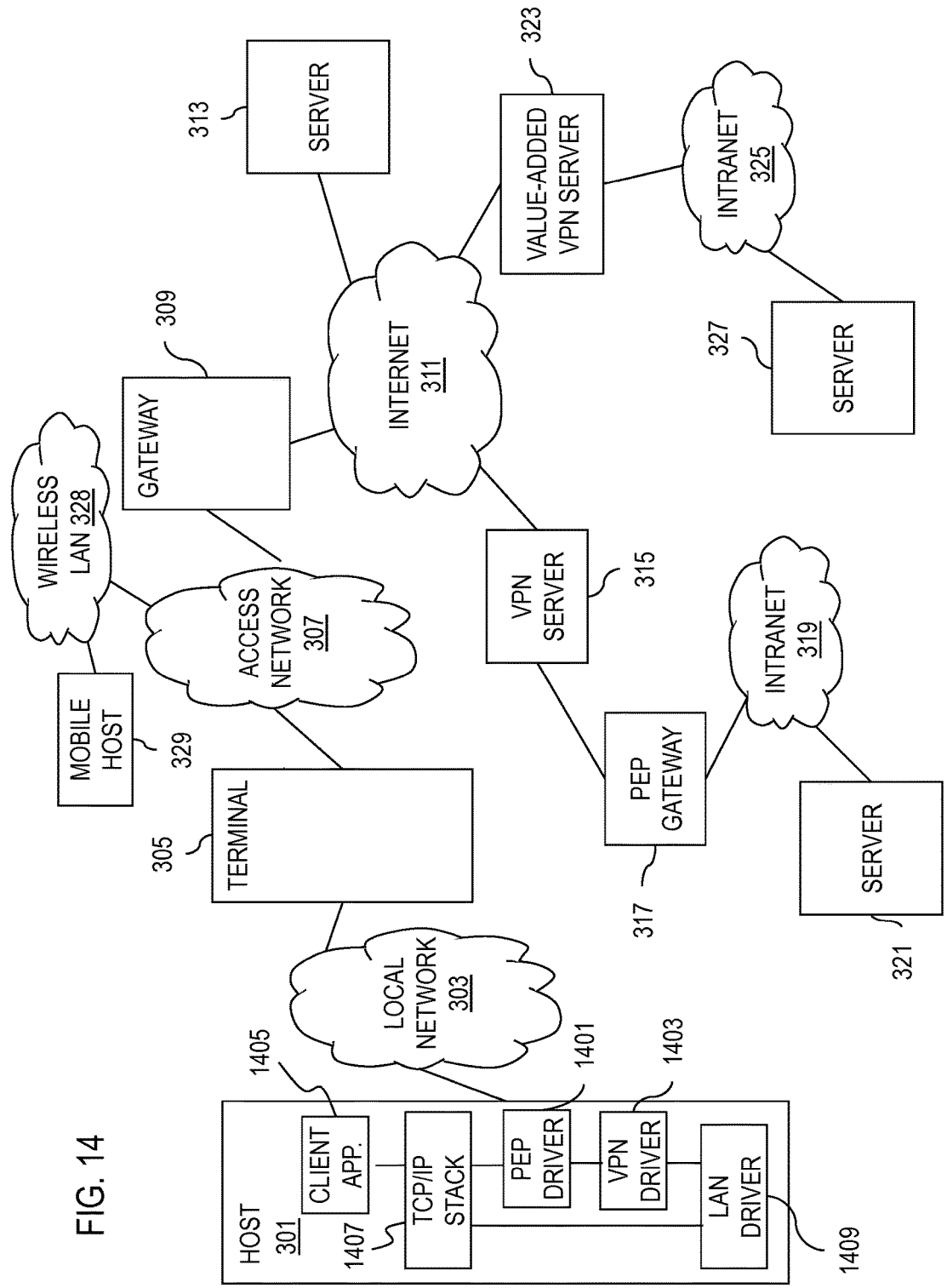
FIG. 14 is a diagram of the system of FIG. 3 in which a host has integrated VPN and PEP functionalities with separate PEP and VPN driver bindings, according to an embodiment of the present invention.

FIG. 14 is a diagram of the system of FIG. 3 in which a host has integrated VPN and PEP functionalities with separate PEP and VPN driver bindings, according to an embodiment of the present invention. The host 301, in this instance, includes a PEP driver 1401 that is separate from a VPN driver 1403. As with the system of FIG. 13, the host 301 has a client application 1405, a TCP/IP stack 1407, and a LAN driver 1409.

Figure 15:
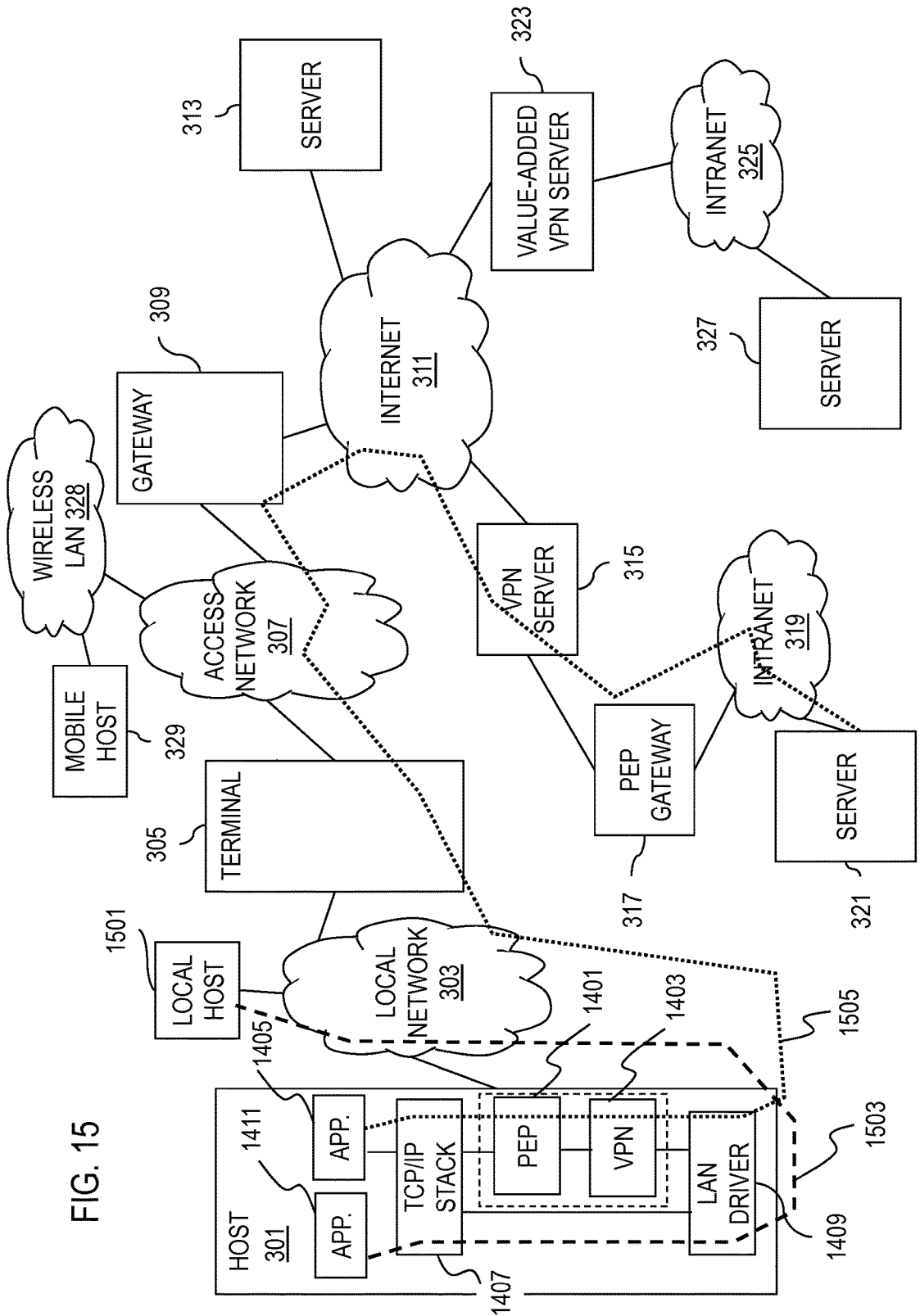
FIG. 15 is a diagram of a packet flow in the system of FIG. 14, according to an embodiment of the present invention.

According to another embodiment of the present invention, the host 301 can be configured to selectively employ the PEP and VPN functions, as shown in FIG. 15.

FIG. 15 is a diagram of a packet flow in the system of FIG. 14, according to an embodiment of the present invention. The host 301 includes two client applications 1405, 1411. The application 1411 generates traffic that is destined to another host 1501 within the local network 303; the traffic follows a path 1503, which bypasses the PEP and VPN functions, as such functions are not needed. However, if the features of the PEP and VPN functions are needed, as in the case of the application 1405, then these functions can be obtained through path 1505, which leads to the server 321 within the intranet 319.

Figure 16:
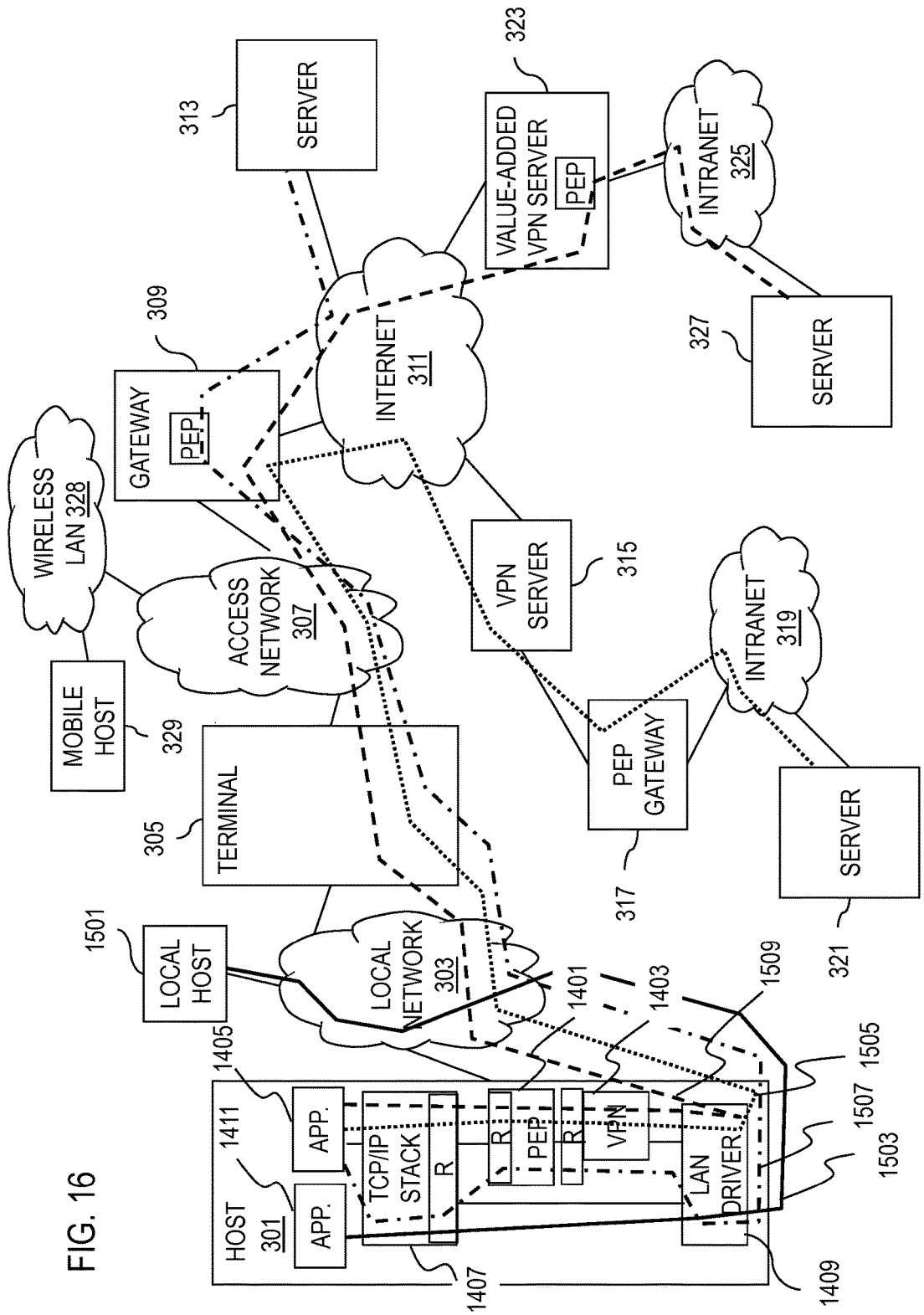
FIG. 16 is a diagram of the system of FIG. 3 in which a host has integrated VPN and PEP functionalities and is capable of dynamically selecting PEP backbone connections, according to an embodiment of the present invention.

FIG. 16 is a diagram of the system of FIG. 3 in which a host has integrated VPN and PEP functionalities and is capable of dynamically selecting PEP backbone connections, according to an embodiment of the present invention. In this implementation, the host 301 maintains a routing table for supporting the selection of PEP connections. The routing operation between the PEP and VPN functions is similar to that detailed in FIG. 12. In this example, the client application 1405 generates packets in which the TCP/IP stack 1407 can utilize the routing table ("R") to map TCP connections to PEP connections, and selectively establish VPN tunnels. For example, if the application 1405 needs to communicate with the server 313 within the Internet 311, then the packets traverse the path 1507, which is strictly PEPed traffic, without triggering establishment of a VPN tunnel.

However, in certain circumstances, the security features of VPN are required, as in the communications to the intranet servers 321, 327. In such instances, the traffic flows along the paths 1505, 1509.

As evident from the above discussion, the integration of PEP and VPN functionalities can enhance network performance, while ensuring a high level of security. Additionally, the present invention supports a variety of configurations within the network elements; this flexibility advantageously enhances network scalability, as the PEP and VPN peers can be independently deployed in a number of network components.

V. Example Computing System

Figure 17:
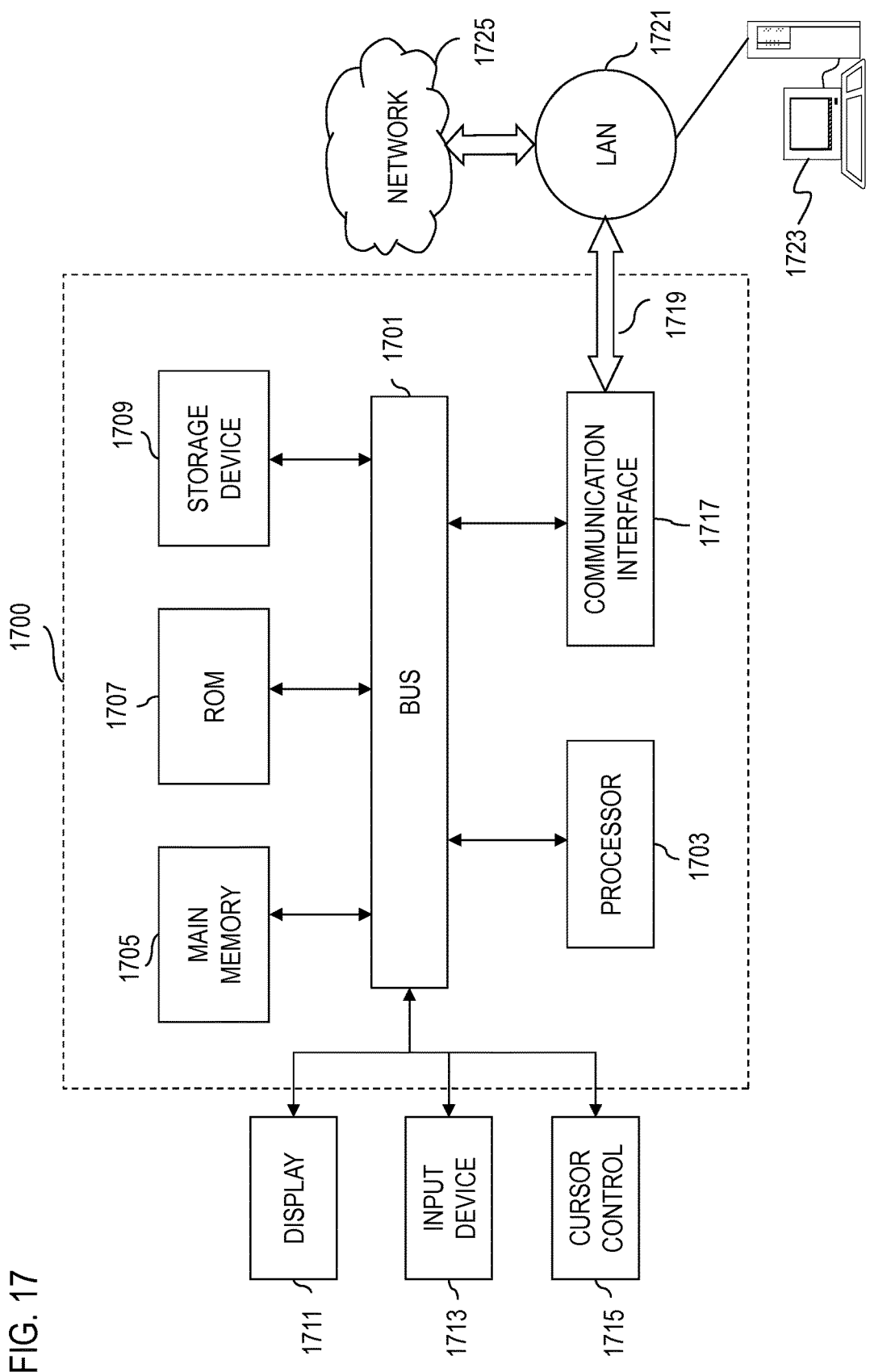
FIG. 17 is a diagram of a computer system that can perform the various processes associated with providing integrated VPN and PEP functionalities, in accordance with an embodiment of the present invention.
Figure 18:
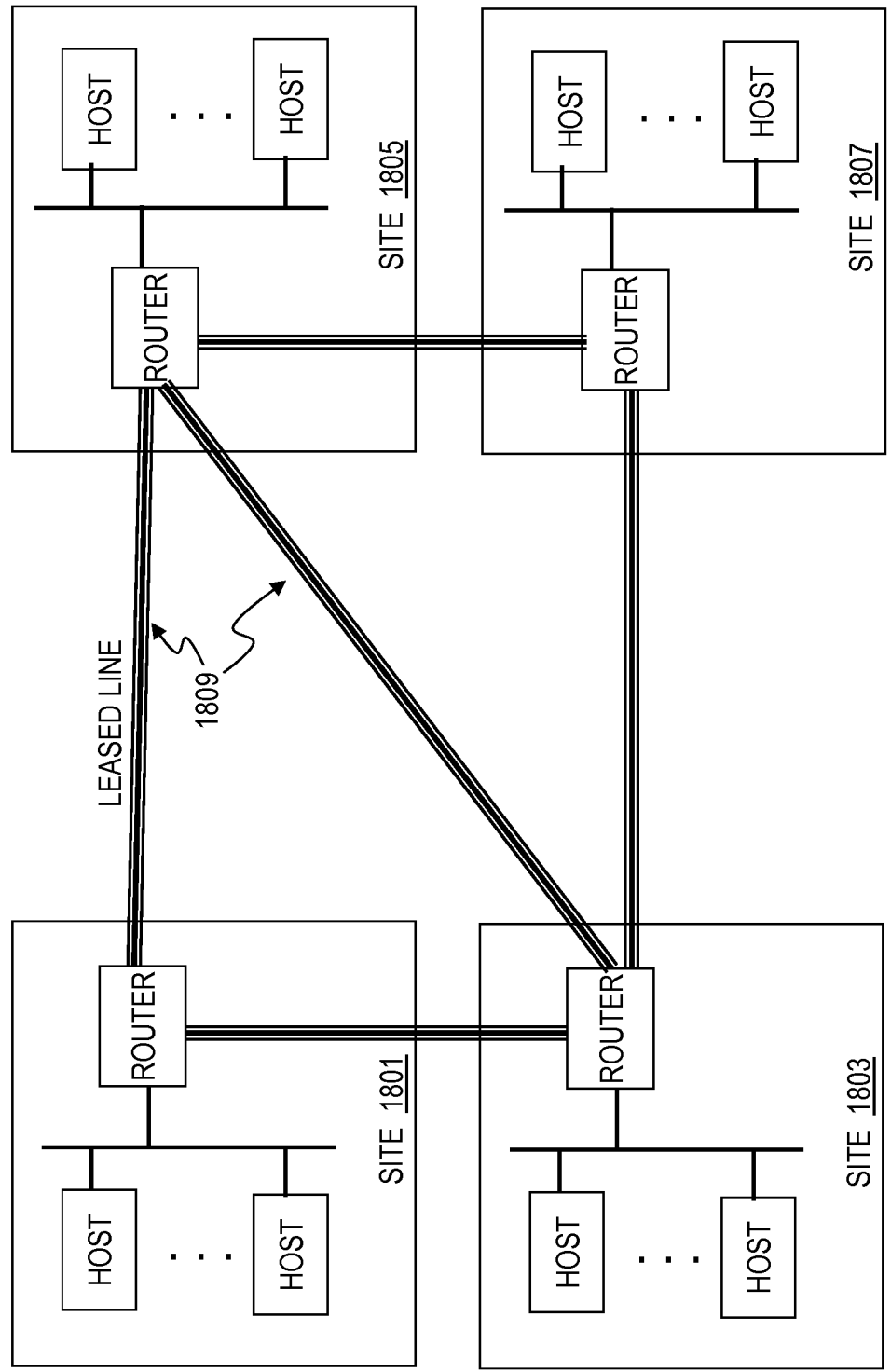
FIG. 18 is a diagram of a conventional private network employing commercial leased lines.
Figure 19:
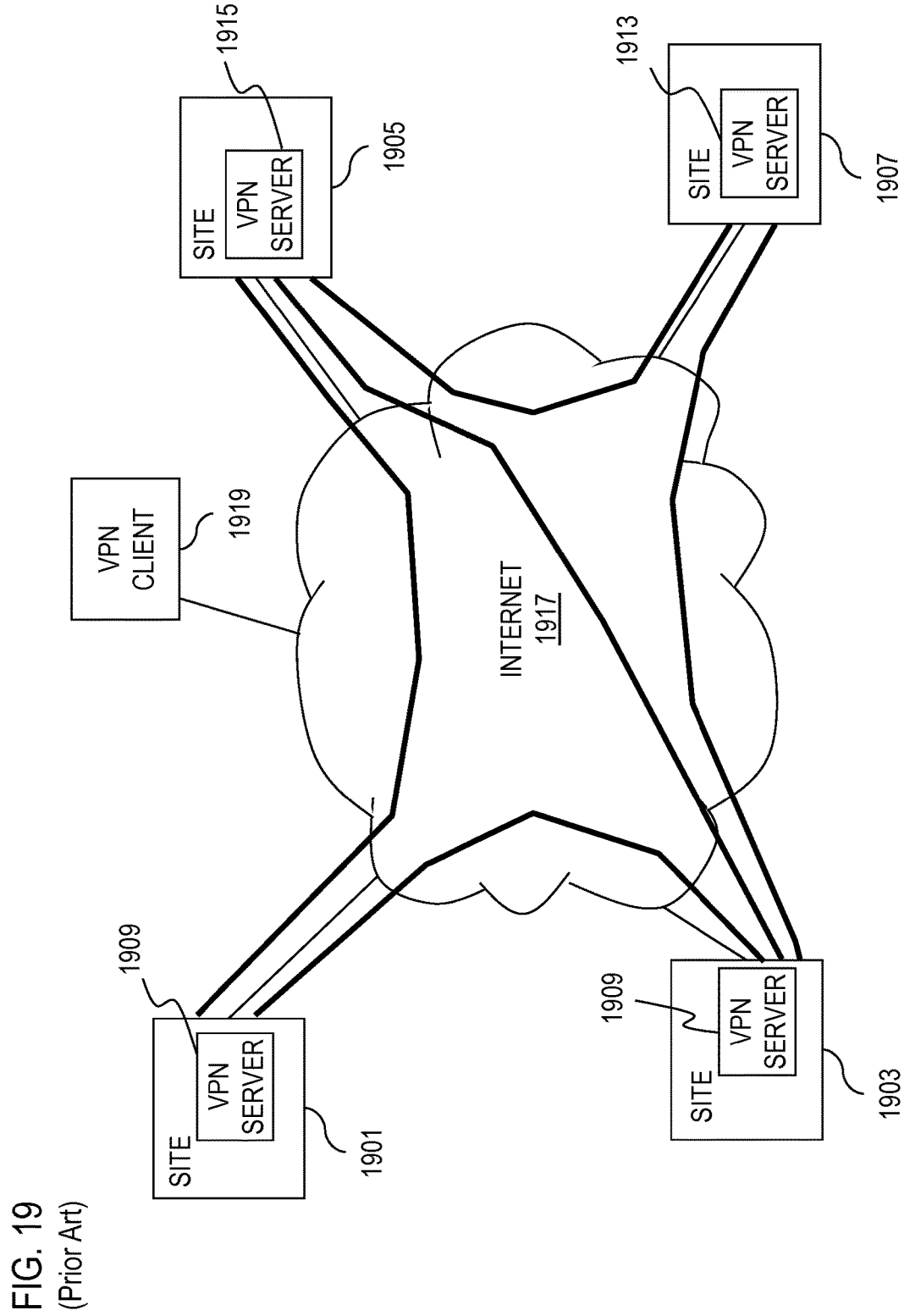
FIG. 19 is a diagram of a conventional virtual private network (VPN).

FIG. 17 illustrates a computer system 1700 upon which an embodiment according to the present invention can be implemented. The computer system 1700 includes a bus 1701 or other communication mechanism for communicating information, and a processor 1703 coupled to the bus 1701 for processing information. The computer system 1700 also includes main memory 1705, such as a random access memory (RAM) or other dynamic storage device, coupled to the bus 1701 for storing information and instructions to be executed by the processor 1703. Main memory 1705 can also be used for storing temporary variables or other intermediate information during execution of instructions to be executed by the processor 1703. The computer system 1700 further includes a read only memory (ROM) 1707 or other static storage device coupled to the bus 1701 for storing static information and instructions for the processor 1703. A storage device 1709, such as a magnetic disk or optical disk, is additionally coupled to the bus 1701 for storing information and instructions.

The computer system 1700 can be coupled via the bus 1701 to a display 1711, such as a cathode ray tube (CRT), liquid crystal display, active matrix display, or plasma display, for displaying information to a computer user. An input device 1713, such as a keyboard including alphanumeric and other keys, is coupled to the bus 1701 for communicating information and command selections to the processor 1703. Another type of user input device is cursor control 1715, such as a mouse, a trackball, or cursor direction keys for communicating direction information and command selections to the processor 1703 and for controlling cursor movement on the display 1711.

According to one embodiment of the invention, the integrated PEP and VPN function is provided by the computer system 1700 in response to the processor 1703 executing an arrangement of instructions contained in main memory 1705. Such instructions can be read into main memory 1705 from another computer-readable medium, such as the storage device 1709. Execution of the arrangement of instructions contained in main memory 1705 causes the processor 1703 to perform the process steps described herein. One or more processors in a multi-processing arrangement can also be employed to execute the instructions contained in main memory 1705. In alternative embodiments, hard-wired circuitry can be used in place of or in combination with software instructions to implement the embodiment of the present invention. Thus, embodiments of the present invention are not limited to any specific combination of hardware circuitry and software.

The computer system 1700 also includes a communication interface 1717 coupled to bus 1701. The communication interface 1717 provides a two-way data communication coupling to a network link 1719 connected to a local network 1721. For example, the communication interface 1717 can be a digital subscriber line (DSL) card or modem, an integrated services digital network (ISDN) card, a cable modem, or a telephone modem to provide a data communication connection to a corresponding type of telephone line. As another example, communication interface 1717 can be a local area network (LAN) card (e.g. for Ethernet™ or an Asynchronous Transfer Model (ATM) network) to provide a data communication connection to a compatible LAN. Wireless links can also be implemented. In any such implementation, communication interface 1717 sends and receives electrical, electromagnetic, or optical signals that carry digital data streams representing various types of information. Further, the communication interface 1717 can include peripheral interface devices, such as a Universal Serial Bus (USB) interface, a PCMCIA (Personal Computer Memory Card International Association) interface, etc.

The network link 1719 typically provides data communication through one or more networks to other data devices. For example, the network link 1719 can provide a connection through local network 1721 to a host computer 1723, which has connectivity to a network 1725 (e.g., a wide area network (WAN) or the global packet data communication network now commonly referred to as the "Internet") or to data equipment operated by service provider. The local network 1721 and network 1725 both use electrical, electromagnetic, or optical signals to convey information and instructions. The signals through the various networks and the signals on network link 1719 and through communication interface 1717, which communicate digital data with computer system 1700, are example forms of carrier waves bearing the information and instructions. Although a single interface 1717 is shown, it is recognized that multiple communication interfaces can be utilized, depending on the connectivity desired.

The computer system 1700 can send messages and receive data, including program code, through the network(s), network link 1719, and communication interface 1717. In the Internet example, a server (not shown) might transmit requested code belonging an application program for implementing an embodiment of the present invention through the network 1725, local network 1721 and communication interface 1717. The processor 1703 can execute the transmitted code while being received and/or store the code in storage device 1709, or other non-volatile storage for later execution. In this manner, computer system 1700 can obtain application code in the form of a carrier wave.

The term "computer-readable medium" as used herein refers to any medium that participates in providing instructions to the processor 1703 for execution. Such a medium can take many forms, including but not limited to non-volatile media, volatile media, and transmission media. Non-volatile media include, for example, optical or magnetic disks, such as storage device 1709. Volatile media include dynamic memory, such as main memory 1705. Transmission media include coaxial cables, copper wire and fiber optics, including the wires that comprise bus 1701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the present invention can initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) and a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, an approach for integrating Virtual Private Network (VPN) and Performance Enhancing Proxying (PEP) in which a VPN tunnel can be segmented to selectively provide PEP functionality. PEP peers can establish a PEP connection to support the PEP function for any portion of the VPN tunnel, particularly, the portion that traverses a high latency network. This approach advantageously supports secure communications, while enabling a service provider to implement the PEP function and VPN function independently throughout the network, thereby reducing costs and improving flexibility.

While the present invention has been described in connection with a number of embodiments and implementations, the present invention is not so limited but covers various obvious modifications and equivalent arrangements, which fall within the purview of the appended claims.

What is claimed is:

1. A method comprising:
   establishing, by a first security peer node of a first network site, a secure data tunnel from the first security peer node to a second security peer node of a second network site remote from the first network site via a plurality of secure segments across a data communications network;
   providing, by the first security peer node, a notification to a first performance enhancing proxy (PEP) node of the first network site confirming the establishment of the secure data tunnel; and
   establishing, by the first PEP node, upon receipt of the notification from the first security peer node, a PEP connection between the first PEP node and a second PEP node of the second network site via the secure data tunnel, wherein the receipt of the notification from the first security peer node confirming the establishment of the secure data tunnel triggers the establishing of the PEP connection by the first PEP node; and
   wherein the PEP connection provides a performance enhancing function, and
   wherein the performance enhancing function multiplexes one or more data packet flows for transmission over the PEP connection from the first network site to the second network site.

2. The method according to claim 1, wherein the establishment of the PEP connection via the secure data tunnel comprises:
   determining that the data packet flows are to be carried via the secure data tunnel; and
   establishing the PEP connection by performing a connection startup process with the second PEP node and initiating the performance enhancing function.

3. The method according to claim 1, wherein the secure data tunnel consists of a virtual private network (VPN) tunnel formed by the plurality of secure segments across the data communications network.

4. The method according to claim 1, wherein at least one of the data packet flows is generated in accordance with transmission control protocol (TCP)/Internet protocol (IP) data communications protocols.

5. The method according to claim 1, wherein the PEP connection comprises a plurality of data sub-paths, wherein each data sub-path corresponds to a different priority level configured to carry data packets of the respective priority level, and wherein each data packet flow is assigned to a one of the sub-paths based on one or more predetermined priority assignment rules.

6. The method according to claim 5, wherein the performance enhancing function includes one or more of connection startup latency reduction, acknowledgment message spoofing, window sizing adjustment, compression and selective retransmission.

7. The method according to claim 5, wherein the predetermined priority assignment rules are based on criteria corresponding to the data packet flows, wherein the criteria comprise one or more of destination IP address, source IP address, source port number, destination port number, user datagram protocol (UDP) source port number, UDP destination port number, type of service (TOS), and data type.

8. An apparatus comprising:
   a first security peer node of a first network site configured to establish a secure data tunnel from the first security peer node to a second security peer node of a second network site via a plurality of secure segments across a data communications network, wherein the second network site is located remote from the first network site; and
   a first performance enhancing proxy (PEP) node of the first network site configured to establish a PEP connection between the first PEP node and a second PEP node of the second network site via the secure data tunnel; and
   wherein the PEP connection provides a performance enhancing function,
   wherein the performance enhancing function multiplexes one or more data packet flows for transmission over the PEP connection, and
   wherein the first security peer is further configured to provide a notification to the first PEP node confirming the establishment of the secure data tunnel, and the receipt of the notification from the first security peer node confirming the establishment of the secure data tunnel triggers the establishing of the PEP connection by the first PEP node.

9. The apparatus according to claim 8, wherein the performance enhancing function includes one or more of connection startup latency reduction, acknowledgment message spoofing, window sizing adjustment, compression and selective retransmission.

10. The apparatus according to claim 8, wherein the establishment of the PEP connection via the secure data tunnel comprises:
    determining that the data packet flows are to be carried via the secure data tunnel; and;
    establishing the PEP connection by performing a connection startup process with the second PEP node and initiating the performance enhancing function.

11. The apparatus according to claim 8, wherein the secure data tunnel consists of a virtual private network (VPN) tunnel formed by the plurality of secure segments across the data communications network.

12. The apparatus according to claim 8, wherein at least one of the data packet flows is generated in accordance with transmission control protocol (TCP) / Internet protocol (IP) data communications protocols.

13. The apparatus according to claim 8, wherein the PEP connection comprises a plurality of data sub-paths, wherein each data sub-path corresponds to a different priority level configured to carry data packets of the respective priority level, and wherein each data packet flow is assigned to a one of the sub-paths based on one or more predetermined priority assignment rules.

14. The apparatus according to claim 13, wherein the predetermined priority assignment rules are based on criteria corresponding to the data packet flows, wherein the criteria comprise one or more of destination IP address, source IP address, source port number, destination port number, user datagram protocol (UDP) source port number, UDP destination port number, type of service (TOS), and data type.

15. The apparatus according to claim 8, wherein, upon receipt of a notification of a failure of one or more of the plurality of secure segments that inhibits the data packet flows over the PEP connection, the first PEP node is configured to terminate the PEP connection.

16. The apparatus according to claim 15, wherein, upon an initiation of a new data packet flow to be carried over the secure data tunnel, the first PEP node is configured to determine whether the performance enhancing function should be applied to the new packet data flow, and wherein (i) in an event that the first PEP node determines that the performance enhancing function should be applied to the new packet data flow, the first PEP node is configured to establish a new PEP connection between the first PEP node and the second PEP node via the secure data tunnel for transmitting the new data packet flow over the new PEP connection subject to the performance enhancing function, and (ii) in an event that the first PEP node determines that the performance enhancing function should not be applied to the new packet data flow, the first PEP node is configured to allow the new packet data flow to function without application of the performance enhancing function.

17. The method according to claim 1, wherein, upon receipt by the first PEP node of a notification of a failure of one or more of the plurality of secure segments that inhibits the data packet flows over the PEP connection, the method further comprises terminating the PEP connection.

18. The method according to claim 17, wherein, upon an initiation of a new data packet flow to be carried over the secure data tunnel, the method further comprises:

determining, by the first PEP node, whether the performance enhancing function should be applied to the new packet data flow; and wherein, in an event that the first PEP node determines that the performance enhancing function should be applied to the new packet data flow, the method further comprises establishing, by the first PEP node, a new PEP connection between the first PEP node and the second PEP node via the secure data tunnel for transmitting the new data packet flow over the new PEP connection subject to the performance enhancing function; and wherein in an event that the first PEP node determines that the performance enhancing function should not be applied to the new packet data flow, the method further comprises allowing the new packet data flow to function without application of the performance enhancing function.

19. The apparatus according to claim 8, wherein, upon receipt of a notification of a failure of one or more of the plurality of secure segments that inhibits the data packet flows over the PEP connection, the first PEP node is further configured to terminate any protocol data connections facilitating the packet data flows being carried by the PEP connection.

20. The method according to claim 1, wherein, upon receipt by the first PEP node of a notification of a failure of one or more of the plurality of secure segments that inhibits the data packet flows over the PEP connection, the method further comprises terminating any protocol data connections facilitating the packet data flows being carried by the PEP connection.

* * * * *